United States Patent
Matsui et al.

(10) Patent No.: US 7,639,702 B2
(45) Date of Patent: Dec. 29, 2009

(54) PLUG-IN CARD FOR OPTICAL TRANSMISSION APPARATUS

(75) Inventors: Hideki Matsui, Kawasaki (JP); Mitsuhiro Kawaguchi, Kawasaki (JP); Masahiro Shioda, Kawasaki (JP); Ryuji Kayama, Kawasaki (JP); Takashi Kaiga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 11/528,370

(22) Filed: Sep. 28, 2006

(65) Prior Publication Data

US 2007/0263646 A1 Nov. 15, 2007

(30) Foreign Application Priority Data

May 9, 2006 (JP) .............................. 2006-130187

(51) Int. Cl.
*H04L 12/28* (2006.01)
(52) U.S. Cl. .................. 370/404; 370/395.51; 370/463; 713/500; 327/153
(58) Field of Classification Search .................. 370/357, 370/386, 463; 713/500; 327/153
See application file for complete search history.

(56) References Cited

U.S. PATENT DOCUMENTS

| | | | |
|---|---|---|---|
| 6,750,687 B1 * | 6/2004 | Klecka, III | 327/153 |
| 7,243,253 B1 * | 7/2007 | McClary et al. | 713/500 |
| 2002/0097743 A1 * | 7/2002 | Baydar et al. | 370/463 |

FOREIGN PATENT DOCUMENTS

JP 2000-196551 A 7/2000

* cited by examiner

*Primary Examiner*—Dang T Ton
*Assistant Examiner*—Mohamed Kamara
(74) *Attorney, Agent, or Firm*—Staas & Halsey LLP

(57) ABSTRACT

A plug-in card for an optical transmission apparatus includes a J1 generating unit. The J1 generating unit sends information on on-use side J1 data to a plug-in card at a spare side in a redundant structure when the plug-in card operates as an on-use side plug-in card. The J1 generating unit receives information on on-use side J1 data from a plug-in card at the on-use side when the plug-in card operates as a spare side plug-in card. Based on the information, the J1 generating unit matches spare side J1 data to the on-use side J1 data. The plug-in card also includes a B3 byte calculating unit that operates in a similar way as the J1 generating unit does in processing B3 byte data.

18 Claims, 34 Drawing Sheets

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| COUNTRY CODE || SENDING OPERATOR ||| SENDING TOWN/NODE ||| RECEIVING TOWN/NODE ||| X ∘ | M.1400 SERIAL NUMBER |||
| F1 || F2 ||| F3 ||| F4 ||| F5 | F6 |||

(113)

PLUG-IN CARD FOR OPTICAL TRANSMISSION APPARATUS

CROSS-REFERENCE TO RELATED APPLICATIONS

This application is based upon and claims the benefit of priority from the prior Japanese Patent Application No. 2006-130187, filed on May 9, 2006, the entire contents of which are incorporated herein by reference.

BACKGROUND OF THE INVENTION

1. Field of the Invention

The present invention relates to a plug-in card for an optical transmission apparatus.

2. Description of the Related Art

As transmission information increases further in high-speed digital communication services, the speed and volume of transmission signals to be processed in the services also increase. For plug-in services for subscribers, a system employing an Ethernet (registered trademark) has been developed in addition to conventional digital dedicated lines offering a transfer rate of 1.5 megabits per second (Mbps) (DS1) or 45 Mbps (DS3). Hence, a variety of services are added to services provided by the SONET, which serves as a backbone network.

A multi-service provisioning platform (MSPP) is devised to incorporate a variety of services into a single platform. FIG. 31 is a schematic diagram of an optical transmission apparatus to which an MSPP is applied. As shown in FIG. 31, an MSPP apparatus 1 allows a selection of a plug-in card 2 to be mounted on the apparatus 1 according to the type of a required service. The MSPP apparatus 1 includes a control card 3 including a central processing unit (CPU), an on-use-side synchronous-transport-signal switch-fabric (STS-SF) card 4, a spare side STS-SF card 5, an on-use side synchronous (SYNC) card 6, and a spare side SYNC card 7.

To incorporate each service effectively into the MSPP apparatus 1, each plug-in card 2 (unit) has a path termination equipment (PTE) function, such as Ethernet over SONET (EoS) and virtual tributary (VT)-cross connect, and has a required function of terminating/generating a SONET STS path overhead byte (PTE function). FIG. 32 is a schematic diagram for illustrating incorporating the PTE function into an MSPP apparatus having conventional plug-in cards. In the specification and the drawings attached thereto, POH indicates path overhead, and a plug-in card for an optical transmission apparatus may be simply called plug-in card or card.

The MSPP apparatus shown in FIG. 32 includes a first plug-in card 8 having a POH generating circuit 9 and a POH terminating circuit 10, a first VT-SF card 11 having a POH generating circuit 12 and a POH terminating circuit 13, and a second VT-SF card 14 having a POH generating circuit 15. The POH generating circuits 9 and 12, and the POH terminating circuits 10, 13, and 15 are provided as circuits offering the PTE function. The second plug-in card 16 has no PTE function.

The plug-in cards 8 and 16 execute a SONET selection overhead (SOH)/line overhead (LOH) process and a PTE function process on input data. The processed data is put into an on-use side STS-SF card 4 and a spare side STS-SF card 5. Both STS-SF cards 4 and 5 execute circuit switching process on the input data signals. After the circuit switching process is over, the data signals are put out from the plug-in cards 8 and 16.

As necessary, the signals processed by the STS-SF cards 4 and 5 are put into the VT-SF cards 11 and 14 that make a selection on the signals from the on-use side and the spare side. The VT-SF card 11 and 14 execute a VT pointer process and a cross-connect process on the selected signals. The processed signals are then sent back to the STS-SF cards 4 and 5, and are put out of the plug-in cards 8 and 16. When the VT cross-connect process is unnecessary, the MSPP apparatus is not provided with the VT-SF cards.

In recent years, the volume of signals to be processed on a single plug-in card has been increasing with improvement of microfabrication technologies for semiconductors. This has raised a problem of a wider range of influence by a circuit error that happens when a plug-in card is switched from an on-use system onto a spare system for maintenance work. To avoid the problem, a demand is rising for completely interruption-free switchover function that is free from any error including one related to a path overhead. A system provided with such a function is thus expected to be developed.

FIG. 33 is a schematic diagram of a format of a SONET synchronous transport signal level 1 (STS-1) frame and the frame structure of a VT mapped in the payload of the SONET STS-1 frame. As shown in FIG. 33, the VT 23 of 28 channels is mapped in the payload 22 of the STS-1 frame 21. VT 23 is of a multi-frame structure including 4 frames, and a flag for identifying each frame is buried in an H4 byte 24 in the STS-1 path overhead of each frame. The H4 byte 24 represents an indicator.

A VT frame 25 is made up of 108 bytes (=27×4), where a V1 byte 26 and a V2 byte 27, which represent pointers, show the location of a V5 byte 29 that is the head of a VT payload 28. The STS-1 path overhead also includes a J1 byte 30 representing a path trace, and a B3 byte 31 representing a bit interleave parity (BIP)-8.

The following method is known as a method for carrying out interruption-free switchover between an on-use system transfer path and a spare system transfer path. According to the method, SDH virtual container (VC)-4 frames are transmitted in synchronization from an on-use system transmitting unit and a spare system transmitting unit to a receiving unit via an on-use system transfer path and a spare system transfer path, with ID signals multiplexed in the VC-4 overheads of the SDH VC-4 frames transferred through the on-use and spare system transfer paths. The SDH VC-4 frames from both on-use and spare systems are received by the receiving unit, where a phase difference between the VC-4 frames is detected, and a delay or precedence of the received VC-4 frame from one system against the same from the other system is judged based on the received ID signals from both systems. Based on a result of the judgment and the phase difference, the received data from the on-use system and the spare system are matched in timing and phase, and then switchover between the on-use system transfer path and the spare system transfer path is carried out (for example, Japanese Patent Laid-Open Publication No. 2000-196551).

Using conventional plug-in cards, however, may lead to a trouble. For example, when plug-in cards having the PTE function are mounted in redundant arrangement on an MSPP apparatus to execute the POH process and VT-pointer process, byte values, especially the values of J1 bytes and B3 bytes, in the path overheads sometimes become different between on-use side data and spare side data. A difference in the values of J1 bytes results for the following reason. FIG. 34 is a schematic diagram for explaining a difference between J1 byte values at the on-use side and the spare side. SONET GR-253 has a specified path trace function realized by using a J1 byte as consecutive 64 frames.

When a spare side card starts after the start of an on-use side card, or when path trace setup for the on-use side card and that for the spare side card are not carried out simultaneously, insertion timing for the head J1 byte becomes different between on-use data 41 and spare side data 42, as shown in FIG. 34. As a result, J1 byte output subsequent to the head J1 byte becomes different between the on-use side data 41 and the spare side data 42. When redundant switchover is carried out with J1 byte values remaining different, the 64-byte consecutiveness of J1 byte output from the SONET system is disrupted.

FIG. 35 is a schematic diagram of the disruption of consecutiveness of J1 bytes that happens when redundant switchover is carried out. As shown in FIG. 35, a J1 byte 43 as original output consists of consecutive 64 bytes. A J1 byte 44 output at the execution of redundant switchover, however, shows the disruption of 64-byte consecutiveness because the switchover causes the spare side data 42 to start in succession to the on-use side data 41. This causes an adjacent station (opposite node) monitoring a path trace to issue an alarm to inform the occurrence of path trace identifier miss match (TIM), which is an obstacle to network maintenance. The same thing happens in executing a path trace function (16 bytes/64 bytes) original to an SDH system.

A difference in the values of B3 bytes results with the following reason. FIG. 36 is a schematic diagram for explaining the reason for the difference. SONET GR-253 uses a specified B3 byte calculation method that requires a calculation result from a B3 calculation range in the previous frame to be included in every frame. Because of this, when a spare side card is started after the start of an on-use side card, or the order or time of card startup is shifted upon starting the SONET system to prevent simultaneous start of B3 byte calculation both at on-use side and spare side, subsequent calculation results from B3 calculation ranges, i.e., B3 byte values become different between the on-use side data 41 and the spare side data 42.

A difference between the on-use side and spare side in the values of a J1 byte or VT-pointer (V1, V2, V3, and stuff byte) included in a B3 calculation range also constitutes another reason for the difference between the B3 byte values at the on-use side and the spare side. An adjacent station (opposite node) calculates a B3 byte value from data sent from a transmission side unit, and compares a calculation result with a B3 byte value included in the next frame in the data.

FIG. 37 is a schematic diagram for illustrating comparison of B3 bytes executed at an adjacent station upon execution of redundant switchover. As shown in FIG. 37, the adjacent station receives the on-use side data 41 before the execution of redundant switchover, while receives the spare side data 42 after the execution of redundant switchover. When redundant switchover is carried out with B3 byte values remaining different between the on-use side and spare side, a calculation result [B3-A4] from a B3 calculation range in the on-use side data, which is given by the adjacent station just before the switchover, does not coincide with a B3 byte value [B3-S4] included in the spare side data 42 received by the adjacent station just after the switchover. In this case, the adjacent station detects a B3 error irrespective of whether subscriber data (main signal) is erroneous or correct, which hampers network maintenance work.

SUMMARY OF THE INVENTION

It is an object of the present invention to at least solve the above problems in the conventional technologies.

A plug-in card for an optical transmission apparatus according to one aspect of the present invention includes a POH inserting unit that inserts a path overhead byte including J1 byte data and B3 byte data into input data; a J1 byte generating unit that generates J1 byte data for a path overhead byte to send the generated J1 byte data to the POH inserting unit, and that sends information on the J1 byte data to a plug-in card operating at a spare side in a redundant structure when the plug-in card operates as an on-use side plug-in card, the J1 byte generating unit receiving information on J1 byte data from a plug-in card operating at an on-use side in the redundant structure, the information being used by the plug-in card at the on-use side, to match spare side J1 byte data to on-use side J1 byte data on the basis of the information, and sending the matched J1 byte data to the POH inserting unit when the plug-in card operates as a spare side plug-in card; and a B3 byte calculating unit that generates B3 byte data for a path overhead to send the generated B3 byte data to the POH inserting unit, and that sends information on the B3 byte data to a plug-in card operating at the spare side when the plug-in card operates as the on-use side plug-in card, the B3 byte calculating unit receiving information on B3 byte data from a plug-in card operating at the on-use side, the information being used by the plug-in card at the on-use side, to match spare side B3 byte data to on-use side B3 byte data on the basis of the information, and sending the matched B3 byte data to the POH inserting unit when the plug-in card operates as the spare side plug-in card.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
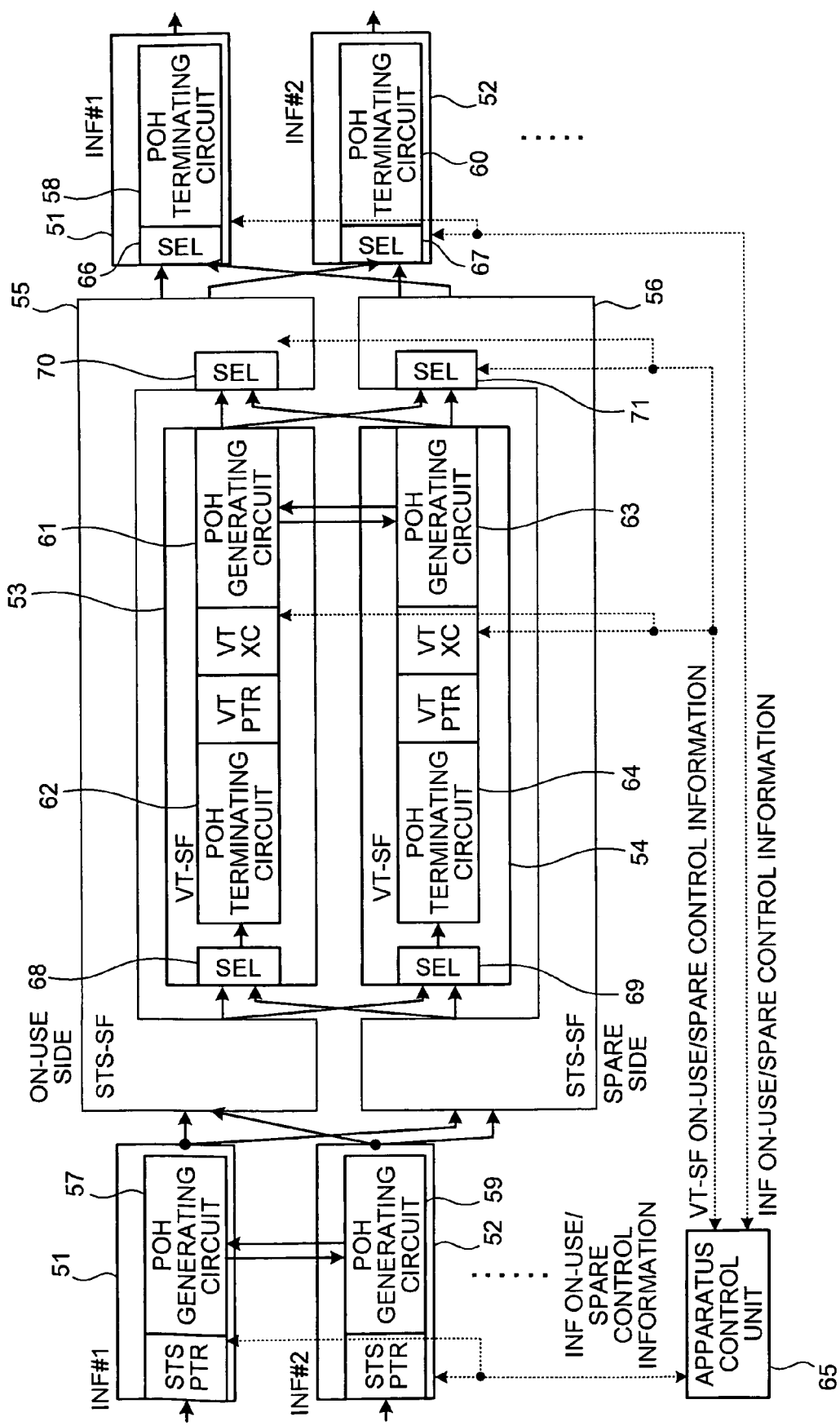
FIG. 1 is a schematic diagram of a PTE function incorporated in an MSPP apparatus provided with a plug-in card according to an embodiment of the present invention.

Exemplary embodiments according to the present invention will be explained in detail below with reference to the accompanying drawings. The same constituent elements are denoted by the same reference numerals to omit repeated descriptions throughout the explanations of the examples.

FIG. 1 illustrates an example of incorporating a PTE function into an MSPP apparatus provided with a plug-in card according to an embodiment of the present invention. As shown in FIG. 1, the MSPP apparatus includes a first plug-in card 51, a second plug-in card 52, a first VT-SF card 53, and a second VT-SF card 54. Each of the plug-in cards 51, 52 and the VT-SF cards 53, 54 is provided as the plug-in card for an optical transmission apparatus according to the present invention. The MSPP apparatus also has an on-use side STS-SF card 55, and a spare side STS-SWF card 56.

For example, the first and second plug-in cards 51, 52 are structured identically, and form a redundant structure. The first and second VT-SF cards 53, 54 are structured identically, and form a redundant structure. The MSPP apparatus is provided with circuits that realize the PTE function. For example, the first plug-in card 51 has a POH generating circuit 57 and a POH terminating circuit 58, the second plug-in card 52 has a POH generating circuit 59 and a POH terminating circuit 60, the first VT-SF cards 53 has a POH generating circuit 61 and a POH terminating circuit 62, and the second VT-SF cards 54 has a POH generating circuit 63 and a POH terminating circuit 64.

These POH generating circuits 57, 59, 61, 63 and the POH terminating circuits 58, 60, 62, 64 are incorporated in the MSPP apparatus according to the type of a service. The POH generating circuits 57 of the first plug-in card 51 and the POH generating circuits 59 of the second plug-in card 52 mutually send and receive information of a J1 byte and a B3 byte in a path overhead to cause an on-use side card and a spare side card to put out the same path overhead value.

Likewise, the POH generating circuits 61 of the first VT-SF card 53 and the POH generating circuits 63 of the second VT-SF card 54 mutually send and receive the information described above, and thus cause the on-use side card and spare side card to put out the same path overhead value. The first and second STS-SF cards 55, 56 are, for example, constructed in the same manner to constitute a redundant structure.

Figure 31:
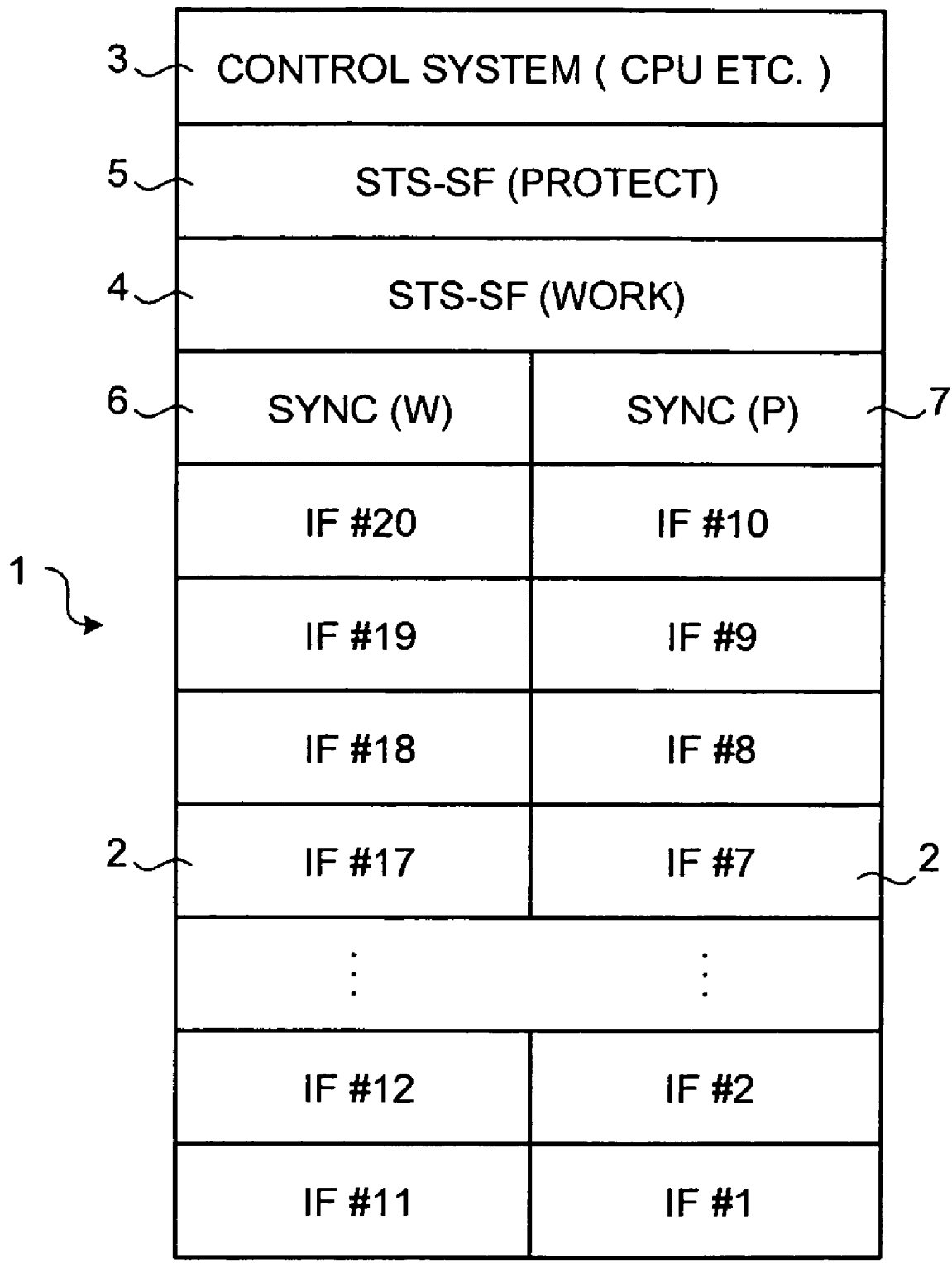
FIG. 31 is a schematic diagram of the MSPP apparatus.

The MSPP apparatus also has an apparatus control unit 65, which is installed in a control card (see FIG. 31). The apparatus control unit 65 notifies each card having the PTE function, i.e., the first and the second plug-in cards 51, 52 and the first and the second VT-SF cards 53, 54 shown in FIG. 1, that whether each card operates at the on-use side or at the spare side.

When the apparatus control unit 65 notifies the first plug-in card 51 of its operation as an on-use side card, the POH generating circuit 57 of the plug-in card 51 operates at the on-use side. A selector 66 installed in the first plug-in card 51 then selects output data from the on-use side STS-SF card 55. When the control unit 65 notifies the first plug-in card 51 of its operation as a spare side card, the POH generating circuit 57 of the plug-in card 51 operates at the spare side. The selector 66 in the first plug-in card 51 then selects output data from the spare side STS-SF card 56.

The second plug-in card 52 operates as the first plug-in card 51 does. A description of operation of the second plug-in card 52 is given by replacing the POH generating circuit 57 with the POH generating circuit 59 and the selector 66 with a selector 67 in the description of operation of the first plug-in card 51.

When the control unit 65 notifies the first VT-SF card 53 of its operation as an on-use side VT-SF card, the POH generating circuit 61 of the VT-SF card 53 operates at the on-use side. A selector 68 installed in the first VT-SF card 53 then selects output data from the front stage of the on-use side STS-SF card 55. When the control unit 65 notifies the first VT-SF card 53 of its operation as a spare side VT-SF card, the POH generating circuit 61 of the VT-SF card 53 operates at the spare side. A selector 68 in the first VT-SF card 53 then selects output data from the front stage of the spare side STS-SF card 56.

The second VT-SF card 54 operates as the first VT-SF card 53 does. A description of operation of the second VT-SF card 54 is given by replacing the POH generating circuit 61 with the POH generating circuit 63 and the selector 68 with a selector 69 in the description of operation of the first VT-SF card 53.

The on-use side STS-SF card 55 receives control information from the apparatus control unit 65. Based on the control information, a selector 70 installed in the on-use side STS-SF card 55 selects output data from an on-use side VT-SF card, which is either the first VT-SF cards 53 or the second VT-SF card 54. Meanwhile, the spare side STS-SF card 56 having a selector 71 causes the selector 71 to select output data from a spare side VT-SF card based on control information from the apparatus control unit 65.

Figure 32:
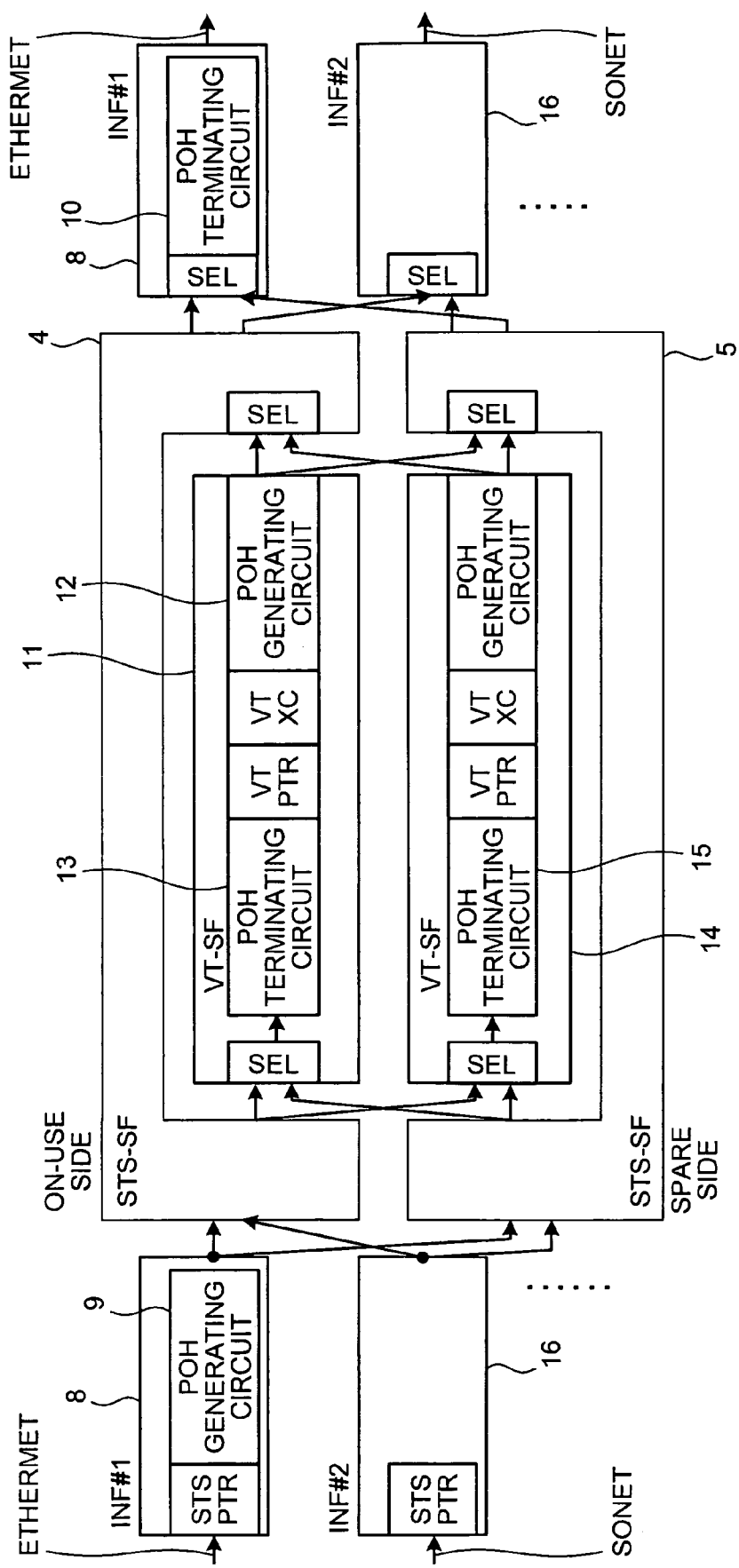
FIG. 32 is a schematic diagram of a PTE function incorporated in an MSPP apparatus provided with a plug-in card according to a conventional technology.
Figure 33:
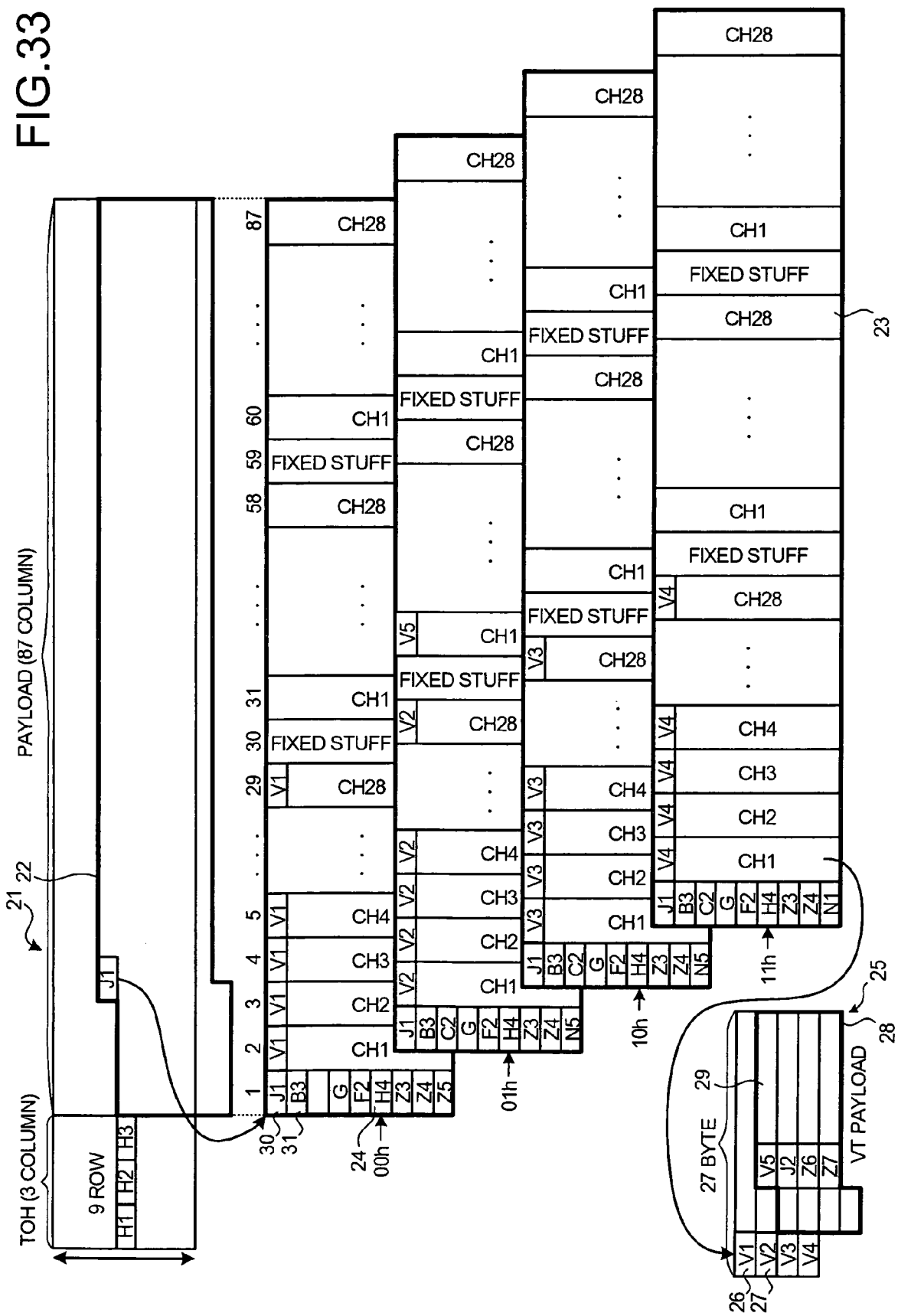
FIG. 33 is a schematic diagram for illustrating a structure of a SONET STS-1 frame.
Figure 34:
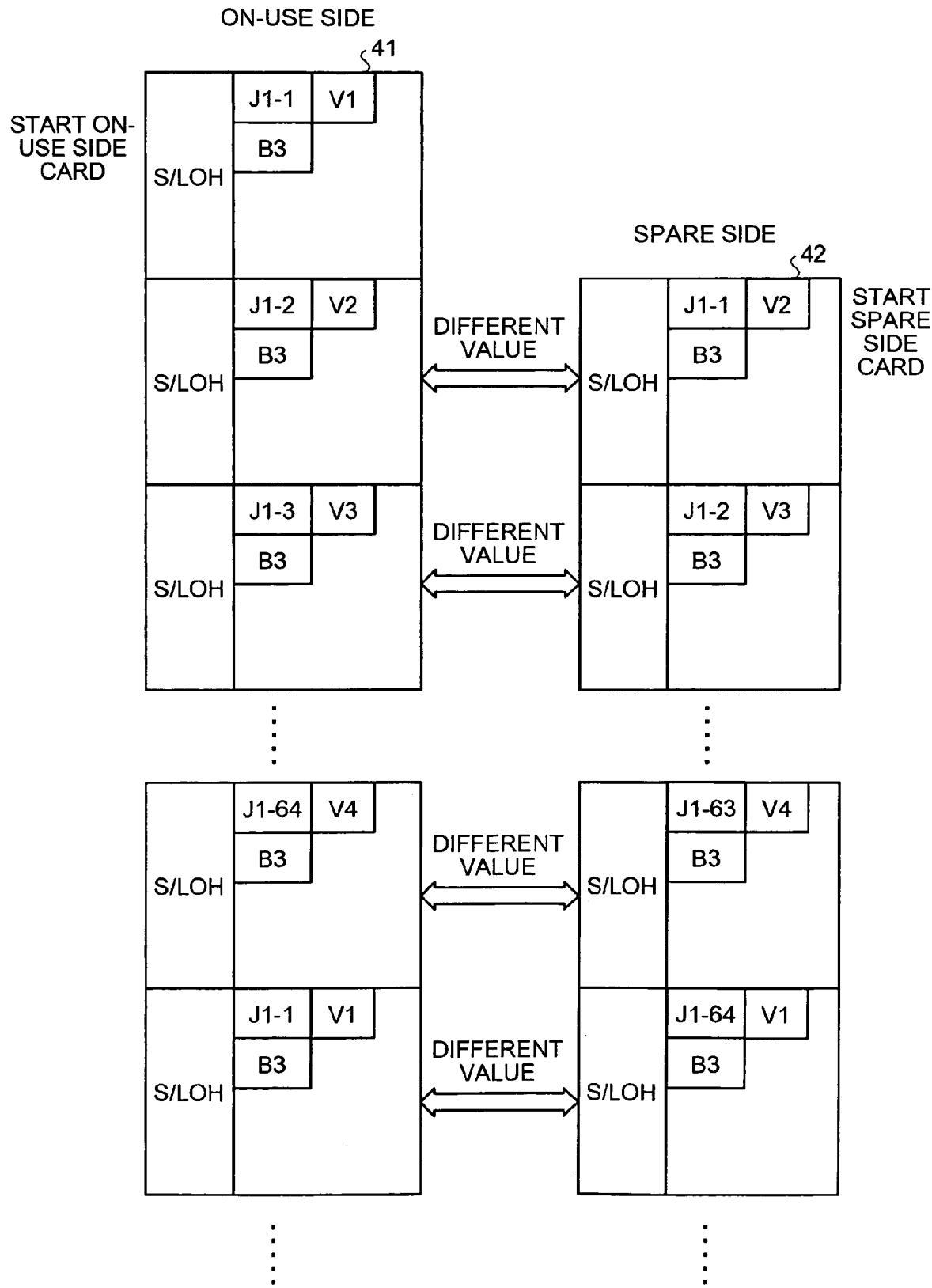
FIG. 34 is a schematic diagram for explaining a difference between J1 byte values at the on-use side and the spare side.
Figure 35:
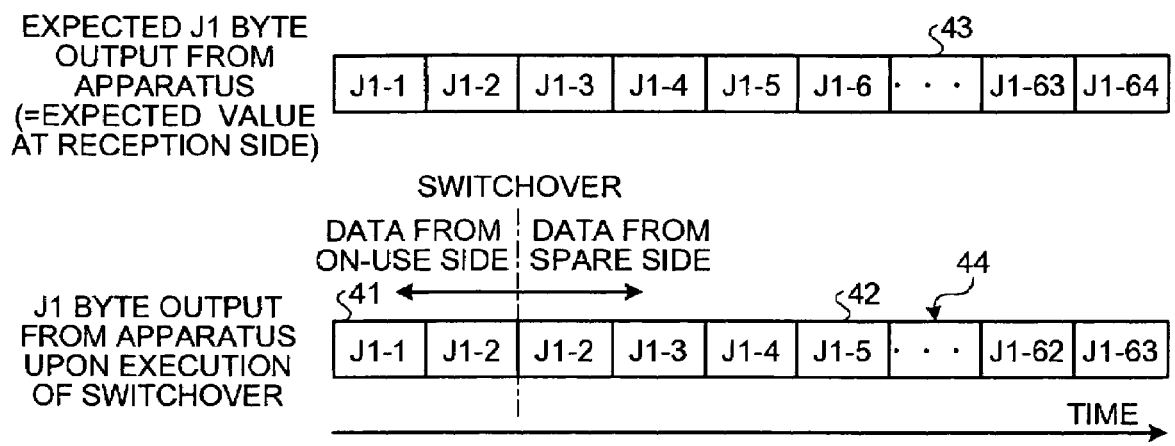
FIG. 35 is a schematic diagram for illustrating disruption of consecutiveness of J1 bytes that happens when redundant switchover is carried out.
Figure 36:
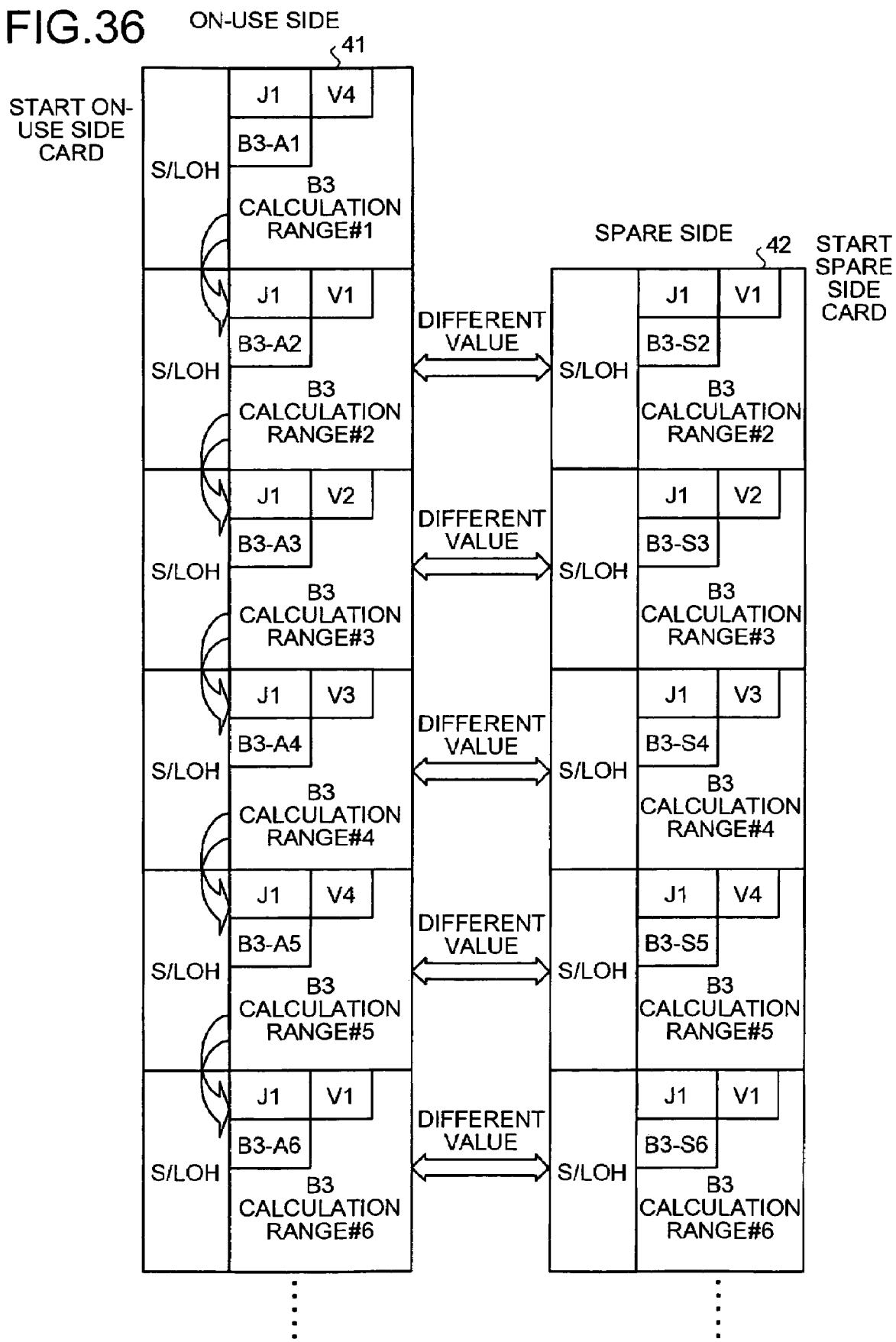
FIG. 36 is a schematic diagram for explaining the difference between J1 byte values at the on-use side and the spare side.
Figure 37:
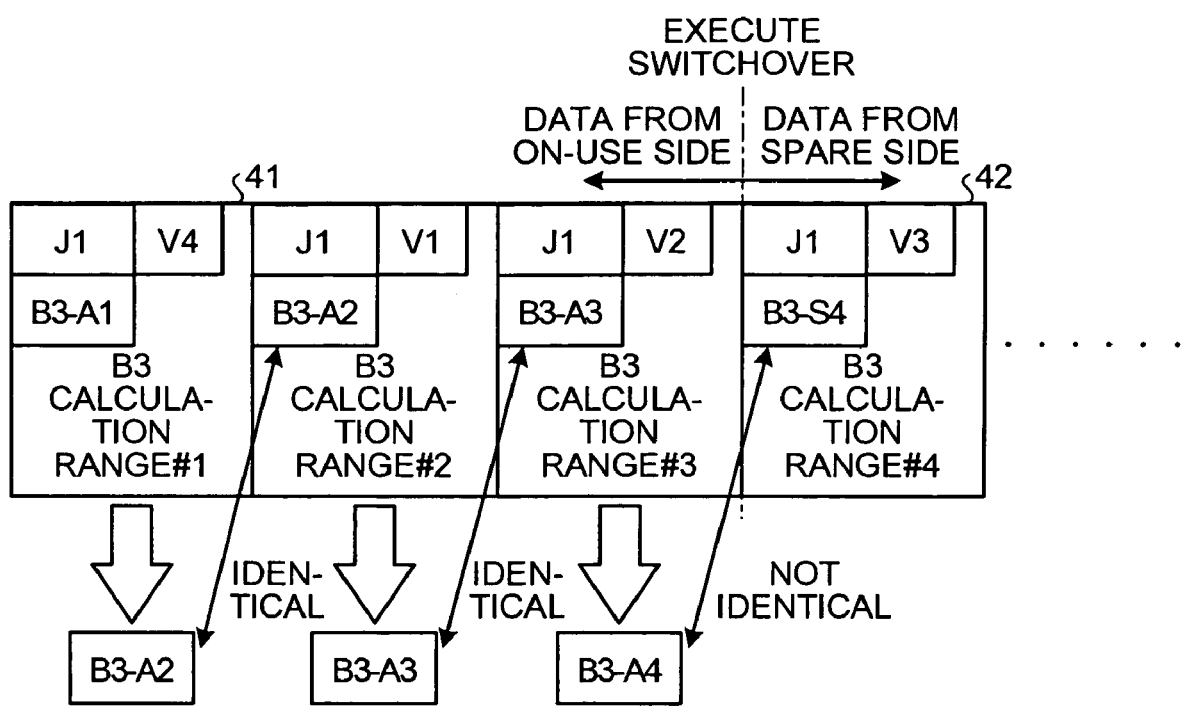
FIG. 37 is a schematic diagram for illustrating comparison of B3 bytes at an adjacent station upon execution of redundant switchover.

Thus, data input into the first and the second plug-in cards 51, 52 are subjected to processes by the on-use side/spare side STS-SF cards 55, 56 and the first and the second VT-SF cards 53, 54, and are put out of the first and the second plug-in cards 51, 52. The process executed by each card is the same process that has been explained referring to FIG. 32 in the section of Description of the Prior Art. Dispensing with the VT-SF cards is allowable to the MSPP apparatus in the same manner as explained in the section of Description of the Prior Art.

In operating the MSPP apparatus having the redundant structure as described above, a maintenance worker is allowed to constantly match on-use side POH output data to spare side POH output data through control by the apparatus control unit 65. The maintenance worker, therefore, can switch onto an on-use side card or onto a spare side card without any operational interruption or error at any desired point during maintenance work by entering a switchover command. After such redundant switchover is carried out, the apparatus control unit 65 notifies a card operating at the on-use side before the switchover that the card has been set to the spare side, and also notifies a card operating at the spare side card before the switchover that the card has been set to the on-use side. Each card thus operates according to the given notification.

Since the POH generating circuits 57, 59, 61, 63 have the same structure, the POH generating circuit 57 is described here as an example representing the rest of POH generating circuits.

(1) First Example of Global Structure of POH Generating Circuit

Figure 2:
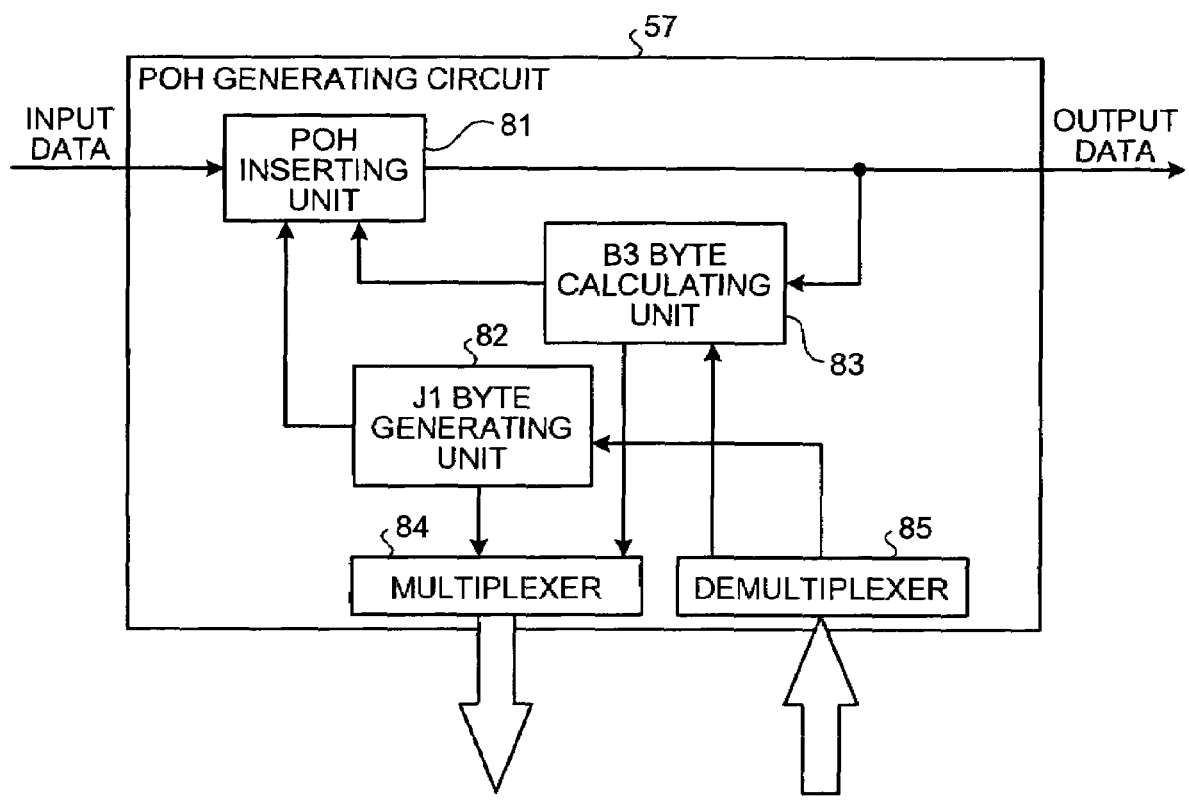
FIG. 2 is a block diagram for illustrating a first example of a POH generating circuit constituting the plug-in card according to the embodiment of the present invention.

FIG. 2 is a block diagram for illustrating a first example of a POH generating circuit. As shown in FIG. 2, the POH generating circuit 57 includes a POH inserting unit 81, a J1 byte generating unit 82, a B3 byte calculating unit 83, a multiplexer 84, and a demultiplexer 85.

The J1 byte generating unit 82 supplies J1 byte data to the POH inserting unit 81, and also supplies data for correcting a J1 byte (hereinafter, "J1 byte correction data") to the multiplexer 84. The J1 byte generating unit 82 receives J1 byte correction data from the demultiplexer 85, and corrects the J1 byte data based on the received correction data.

The B3 byte calculating unit 83 carries out B3 byte calculation based on output data from the POH inserting unit 81, and supplies the result of the calculation to the POH inserting unit 81. The B3 byte calculating unit 83 also supplies data for correcting a B3 byte (hereinafter, "B3 byte correction data") to the multiplexer 84. The B3 byte calculating unit 83 receives B3 byte correction data from the demultiplexer 85, and corrects the B3 byte calculation result based on the received correction data.

The multiplexer 84 puts together the J1 byte correction data from the J1 byte generating unit 82 and the B3 byte correction data from the B3 byte calculating unit 83 to put out both correction data to the plug-in card functioning as the counterpart to the plug-in card including the multiplexer 84 in a redundant structure. The demultiplexer 85 divides incoming data from the counterpart plug-in card into J1 byte correction data and B3 byte correction data, and supplies the J1 byte correction data to the J1 byte generating unit 82, and the B3 byte correction data to the B3 byte calculating unit 83. The POH inserting unit 81 inserts a path overhead including the J1 byte data and B3 byte calculation result into input data, the data and calculation result being given by the J1 byte generating unit 82 and B3 byte calculating unit 83, and puts out the data with the inserted path overhead, which is output data.

Figure 3:
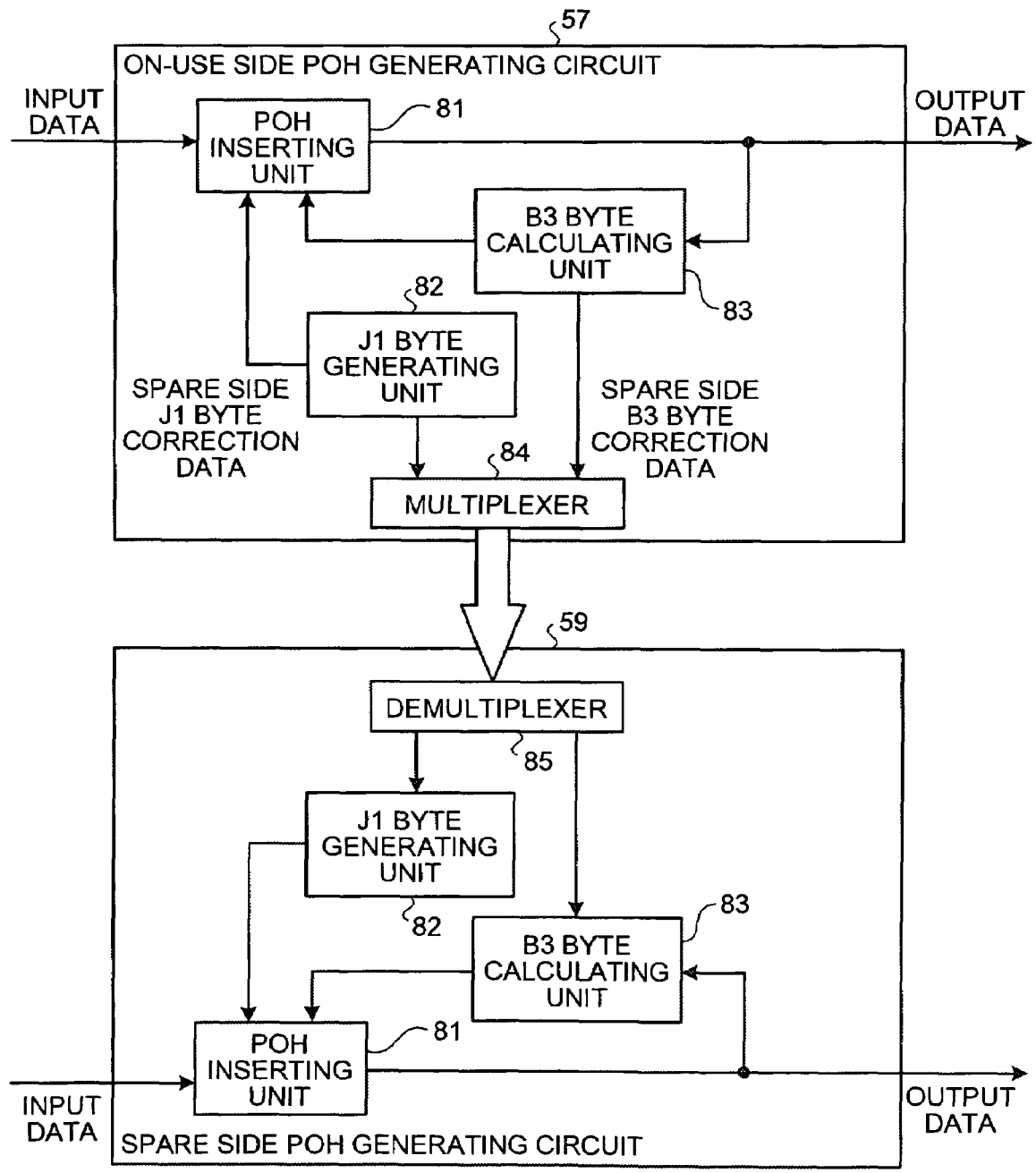
FIG. 3 is a schematic diagram for explaining an operation of the POH generating circuit shown in FIG. 2.

FIG. 3 is a schematic diagram for explaining an operation of the POH generating circuit shown in FIG. 2. The following description is made with regard to a case where the POH generating circuit 57 operates at the on-use side, and the POH generating circuit 59, which is the counterpart to the POH generating circuit 57 in the redundant structure, operates at the spare side (the same case is employed for an operational explanation in other embodiments). The contents of the description applies in the same effect to a case where the POH generating circuits 57, 59 or the POH generating circuits 61, 62 switch the operational side in reverse to each other in a structural combination. To avoid a complicated view, components irrelevant to the operation of the POH generating circuits at each side are omitted from FIG. 3 (the same omission is made in FIGS. 5, 7, 10, 13, 15, 18, 21, 24, 26, 28, and 30.)

As shown in FIG. 3, at the POH generating circuit 57 at the on-use side (hereinafter, "on-use side POH generating circuit"), the POH inserting unit 81 inserts a path overhead into input data, using J1 byte data output from the J1 byte generating unit 82 and a B3 byte calculation result output from the B3 byte calculating unit 83. The on-use side POH generating circuit 57 sends J1 byte correction data output from the J1 byte generating unit 82 and B3 byte correction data output from the B3 byte calculating unit 83 to the POH generating circuit 59 at the spare side via the multiplexer 84.

The POH generating circuit 59 at the spare side (hereinafter, "spare side POH generating circuit") receives the J1 byte correction data and B3 byte correction data sent from the on-use side POH generating circuit 57 via the demultiplexer 85. At the spare side POH generating circuit 59, the J1 byte generating unit 82 corrects J1 byte data based on the J1 byte correction data into the same data as the J1 byte data of the on-use side POH generating circuit 57.

At the spare side POH generating circuit 59, the B3 byte calculating unit 83 corrects a B3 byte calculation result based on the B3 byte correction data into the same data as the B3 byte calculation result of the on-use side POH generating circuit 57. Thus, at the spare side POH generating circuit 59, the POH inserting unit 81 inserts a path overhead having the J1 byte data and B3 byte calculation result identical with that of the on-use side POH generating circuit 57 into input data.

(2) Second Example of Global Structure of POH Generating Circuit

Figure 4:
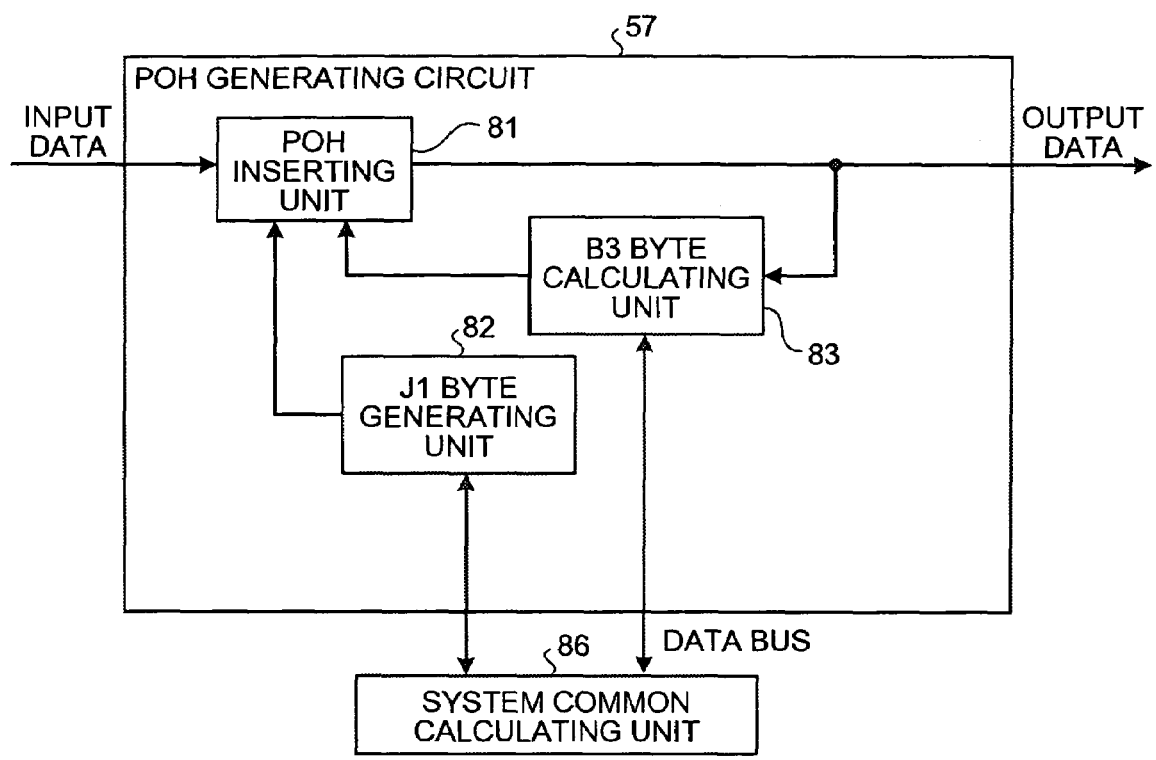
FIG. 4 is a block diagram for illustrating a second example of the POH generating circuit.

FIG. 4 is a block diagram for illustrating a second example of the POH generating circuit. The second example is different from "(1) First Example of Global Structure of POH Generating Circuit" in a process that the J1 byte generating unit 82 supplies J1 byte data and the B3 byte calculating unit 83 supplies a B3 byte calculation result to a system common calculating unit 86, which is a control CPU, etc. arranged outside the plug-in cards. The second example includes another different process that the J1 byte generating unit 82 receives J1 byte correction data and the B3 byte calculating unit 83 receives B3 byte correction data from the system common calculating unit 86.

The system common calculating unit 86 executes a calculation process based on the J1 byte data and B3 byte calculation result receiving from the on-use side POH generating circuit 57 and of the J1 byte data and B3 byte calculation result receiving from the spare side POH generating unit 59, and determines the J1 byte correction data and B3 byte correction data. The system common calculating unit 86 is, for example, installed in the control card incorporated into the MSPP apparatus (see FIG. 31). According to the second example, the on-use side POH generating circuit 57 does not have the multiplexer 84 and the demultiplexer 85.

Figure 5:
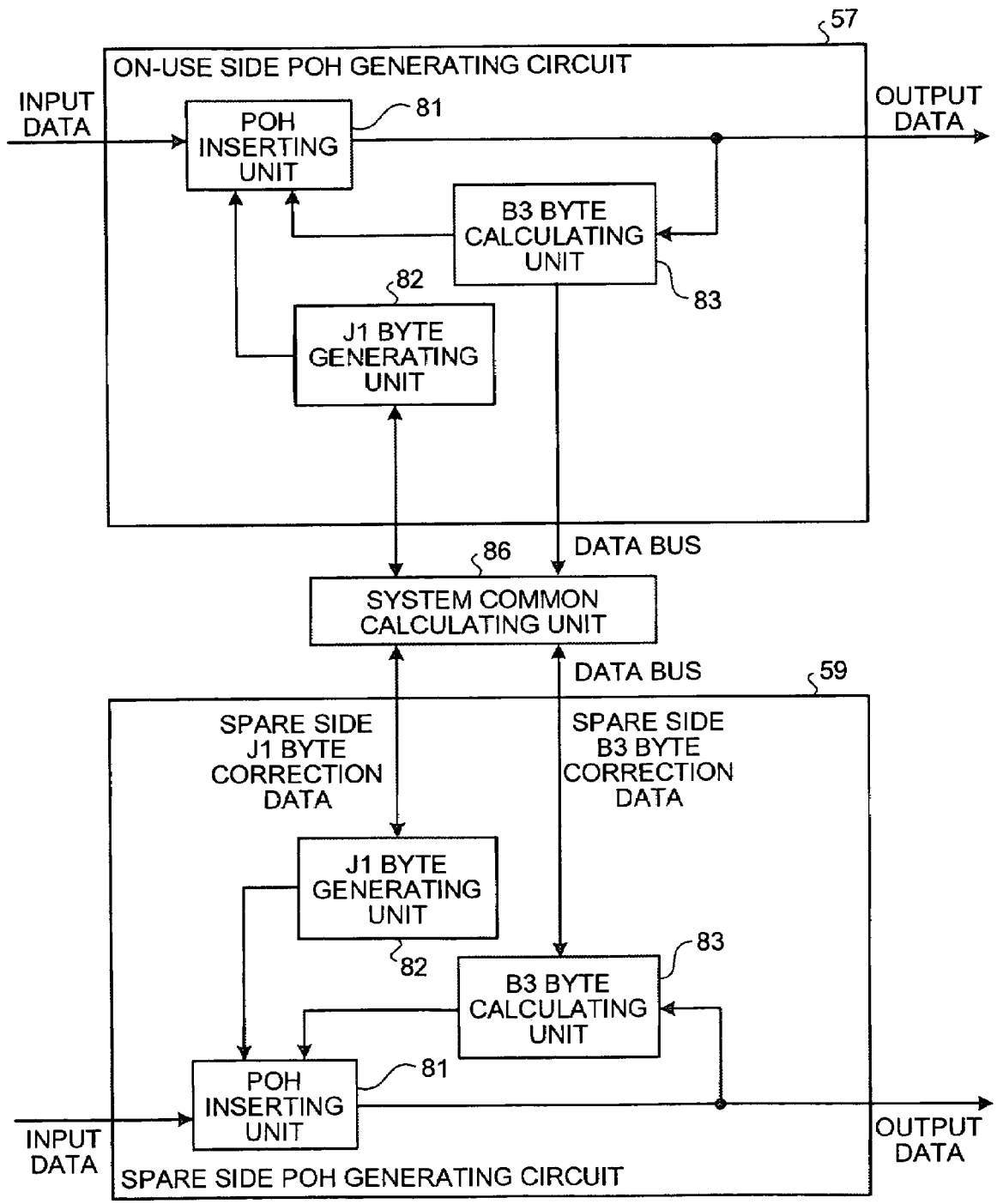
FIG. 5 is a schematic diagram for explaining an operation of the POH generating circuit shown in FIG. 4.

FIG. 5 is a schematic diagram for explaining an operation of the POH generating circuit shown in FIG. 4. The on-use side POH generating circuit 57 causes the POH inserting unit 81 to insert a path overhead into input data, using J1 byte data output from the J1 byte generating unit 82 and a B3 byte calculation result output from the B3 byte calculating unit 83. The on-use side POH generating circuit 57 sends the J1 byte data output from the J1 byte generating unit 82 and B3 byte calculation result output from the B3 byte calculating unit 83 to the system common calculating unit 86 via a data bus.

The spare side POH generating circuit 59 sends J1 byte data output from the J1 byte generating unit 82 and a B3 byte calculation result output from the B3 byte calculating unit 83 to the system common calculating unit 86 via a data bus. The spare side POH generating circuit 59 also receives J1 byte correction data and B3 byte correction data from the system common calculating unit 86 via the data bus.

Based on the received correction data, at the spare side POH generating circuit 59, the J1 byte generating unit 82 and B3 byte calculating unit 83 obtain the data identical with the J1 byte data of the on-use side POH generating circuit 57 and the data identical with the B3 byte calculation result of the on-use side POH generating circuit 57, respectively. Thus, at the spare side POH generating circuit 59, the POH inserting unit 81 inserts a path overhead having the J1 byte data and B3 byte calculation result identical in value with that of the on-use side POH generating circuit 57 into input data.

Each of the following structural examples applies to (1) First Example of Global Structure of POH Generating Circuit.

(3) First Example of Configuration for Producing Identical J1 Byte Data

Figure 6:
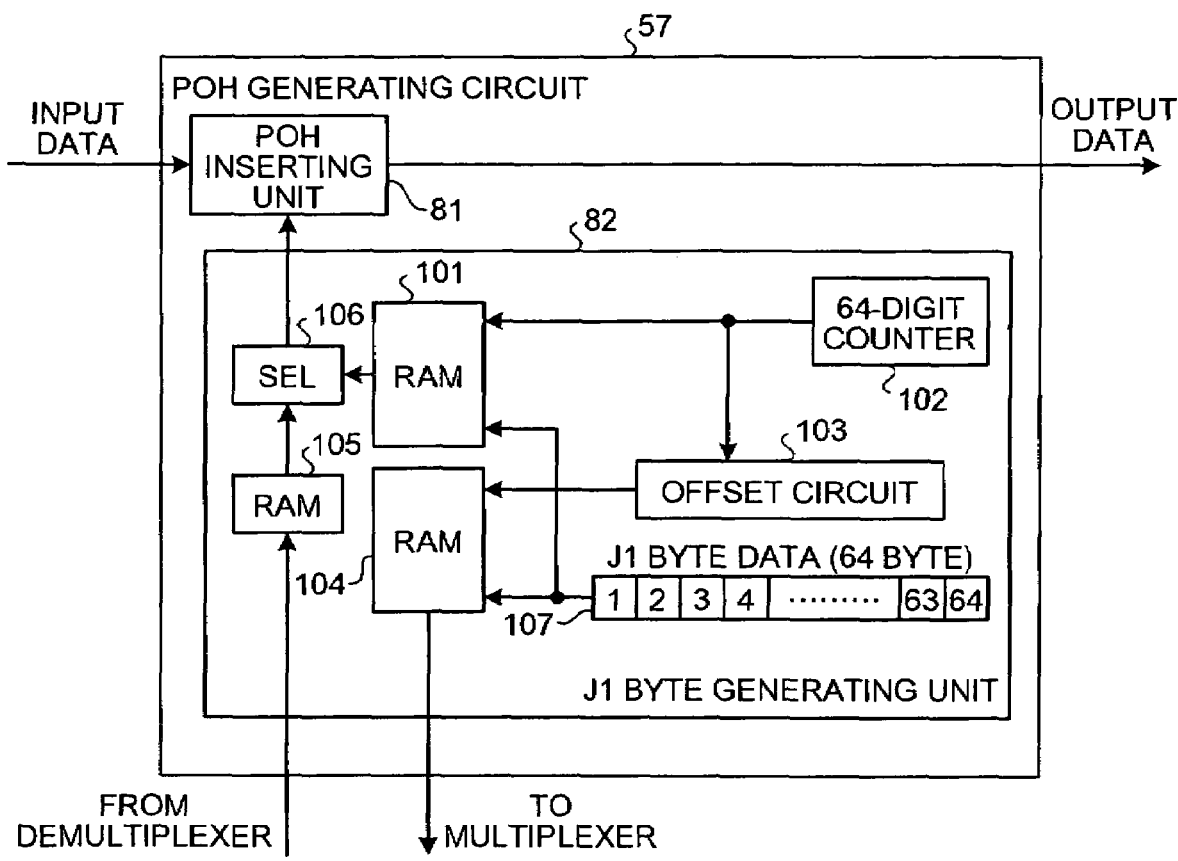
FIG. 6 is a schematic diagram for illustrating a first example of a configuration for producing identical J1 byte data.

FIG. 6 is schematic diagram for illustrating a first example of a configuration for producing identical J1 byte data. As shown in FIG. 6, the J1 byte generating unit 82 includes a first buffer memory 101 such as random access memory (RAM), an address counter 102, for example, that counts up to 64 digits, an offset circuit 103, a second buffer memory (RAM) 104, a third buffer memory (RAM) 105, and a selector 106.

The first buffer memory 101 and the second buffer memory 104 each holds J1 byte data of, for example, 64 bytes that is input from the apparatus control unit 65 (not shown; see FIG. 1). The address counter 102 issues an address for reading the J1 byte data out of the first buffer memory 101. The offset circuit 103 adds a given offset value to the value of an address issued from the address counter 102 to provide an address for reading the JU1 byte memory out of the second buffer memory 104.

The J1 byte data read out of the second buffer memory 104, therefore, advances further than the J1 byte data read out of the first buffer memory 101 by the offset value. This offset value is equivalent to a signal transfer delay caused by a transfer path, such as a cable, that connects a plug-in card operating at the on-use side to a plug-in card operating at the spare side. The J1 byte data read out of the second buffer memory 104 is sent to the multiplexer 84 (not shown; see FIG. 2).

The third buffer memory 105 holds J1 byte correction data sent from the demultiplexer 85 (not shown; see FIG. 2). This J1 byte correction data is the data that has been corrected in terms of a transfer delay between the plug-in cards by the counterpart plug-in card constituting the redundant structure, so that the data is identical with J1 byte data in the counterpart plug-in card. When the POH generating circuit 57 operates at the on-uses side, the selector 106 selects the J1 byte data read out of the first buffer memory 101. When the POH generating circuit 57 operates at the spare side, the selector 106 selects the corrected J1 byte data read out of the third buffer memory 105. The POH inserting unit 81 inserts the J1 byte data selected by the selector 106 into input data.

Figure 7:
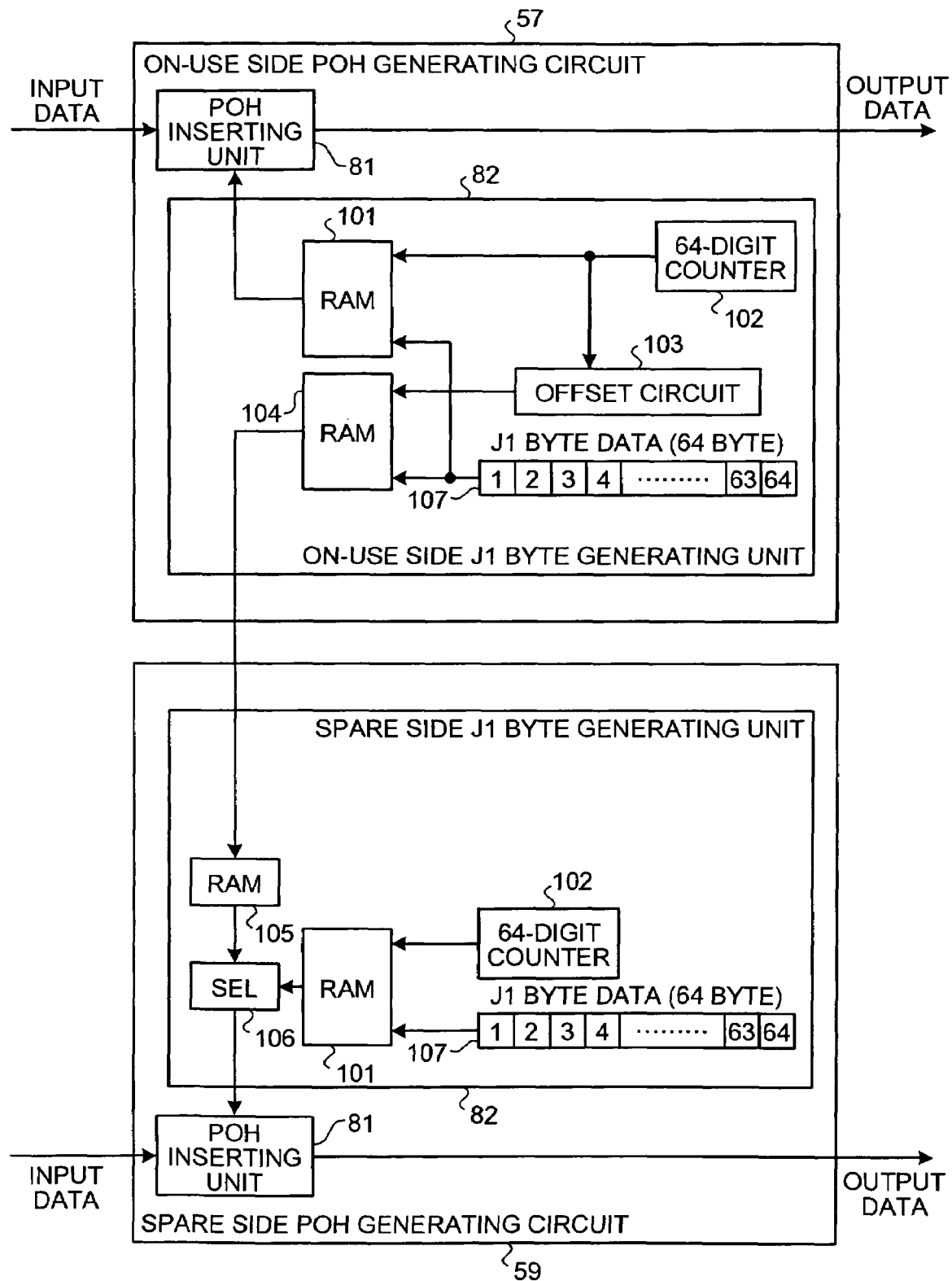
FIG. 7 is a schematic diagram for explaining an operation of the configuration shown in FIG. 6.
Figure 8:
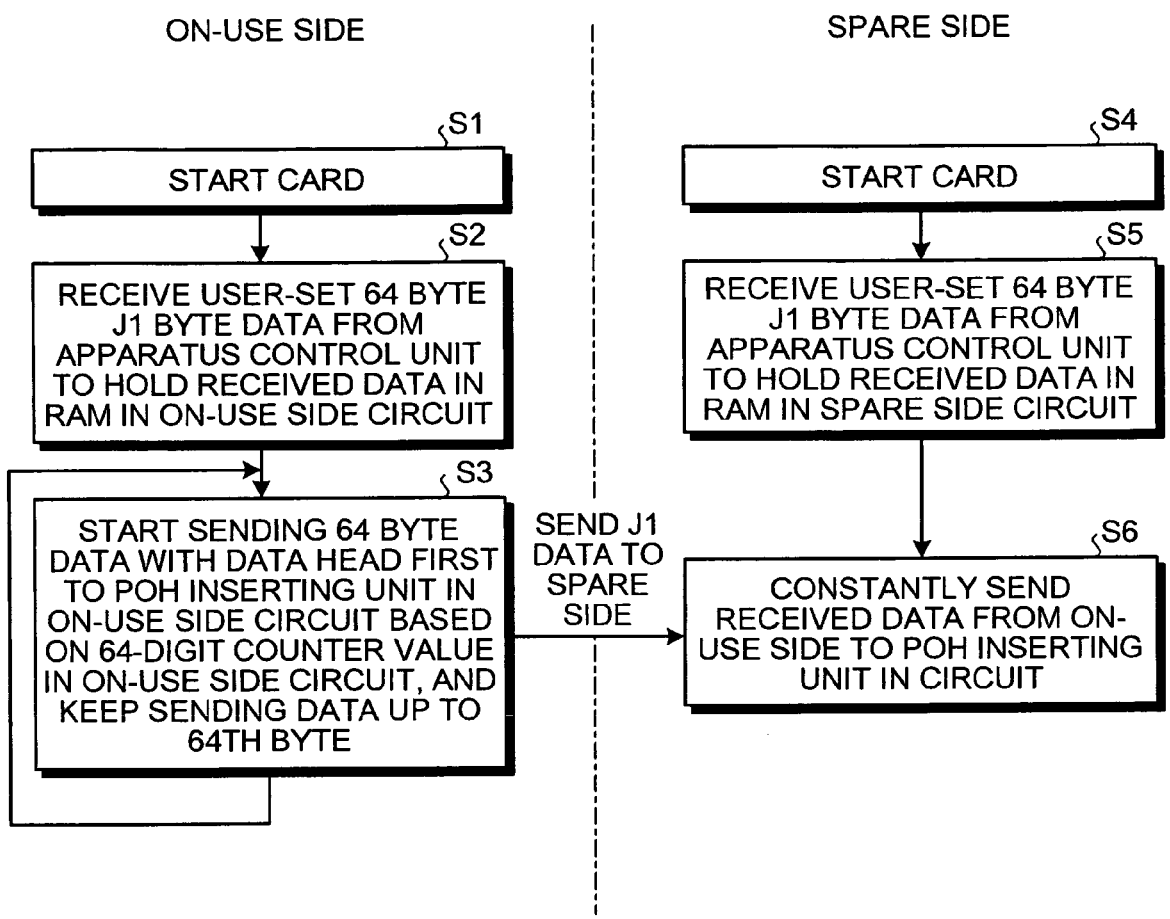
FIG. 8 is a flowchart of an operation for producing identical J1 byte data according to the configuration shown in FIG. 7.

FIG. 7 is a schematic diagram for explaining an operation according to the configuration shown in FIG. 6. FIG. 8 is a flowchart of an operation for producing identical J1 byte data according to the configuration shown in FIG. 7. At the on-use side POH generating circuit 57, as shown in FIG. 7, when the on-use side plug-in card starts (step S1), the first and the second buffer memories 101, 104 in the J1 byte generating unit 82 each holds J1 byte data 107 of, for example, 64 bytes from the apparatus control unit 65 (not shown; see FIG. 1) (step S2).

Subsequently, at the on-use side POH generating circuit 57, the J1 byte data is put out of the first buffer memory 101 consecutively from the head to the last 64th byte of the data based on the value of an address put out of the address counter 102. The J1 byte data put out of the first buffer memory 101 is sent to the POH inserting unit 81 of the on-use side POH generating circuit 57. At the same time, at the on-use side POH generating circuit 57, the J1 byte data is put out of the second buffer memory 104 consecutively from the frame advancing further than the data head by an offset value based on a value given by adding the offset value from the offset circuit 103 to the address value output from the address counter 102.

The J1 byte data put out of the second buffer memory 104 of the on-use side POH generating circuit 57 is sent to the spare side POH generating circuit 59 (step S3). At this time, for example, when the offset value for advancement is 1, the J1 byte data sent to the spare side POH generating circuit 59 becomes the data that advances further by 1 frame (e.g. 125 microsecond (μsec)) than the J1 byte data sent to the POH inserting unit 81 of the on-use side POH generating circuit 57. Afterward, step S3 is repeated at the on-use side POH generating circuit 57. Meanwhile, at the spare side POH generating circuit 59, when the spare side plug-in card starts (step S4), the first buffer memory 101 in the J1 byte generating unit 82 holds the J1 byte data 107 of, for example, 64 bytes from the apparatus control unit 65 (not shown; see FIG. 1) (step S5).

Subsequently, at the spare side POH generating circuit 59, the third buffer memory 105 holds the J1 byte data sent from the on-use side POH generating circuit 57. The selector 106 then selects the J1 byte data held in the third buffer memory 105 from both J1 data each held in the first buffer memory 101 and in the third buffer memory 105. The selected J1 byte data is sent to the POH inserting unit 81 (step S6). Thus, the J1 byte data to be inserted into spare side input data in the spare side POH generating circuit 59 becomes identical with the J1 byte data to be inserted into on-use side input data in the on-use side POH generating circuit 57.

The spare side POH generating circuit 59 may dispense with the third buffer memory 105, and allow the J1 byte data from the on-use side POH generating circuit 57 to be directly put into the selector 106. This is because that the on-use side POH generating circuit 57 and the spare side POH generating circuit 59 operate in synchronization at the same frequency of, for example, 8 kilohertz (KHz), and the offset circuit 103 compensates for a delay in the signal transferred from the on-use side POH generating circuit 57 to the spare side POH generating circuit 59.

(4) Second Example of Configuration for Producing Identical J1 Byte Data

Figure 9:
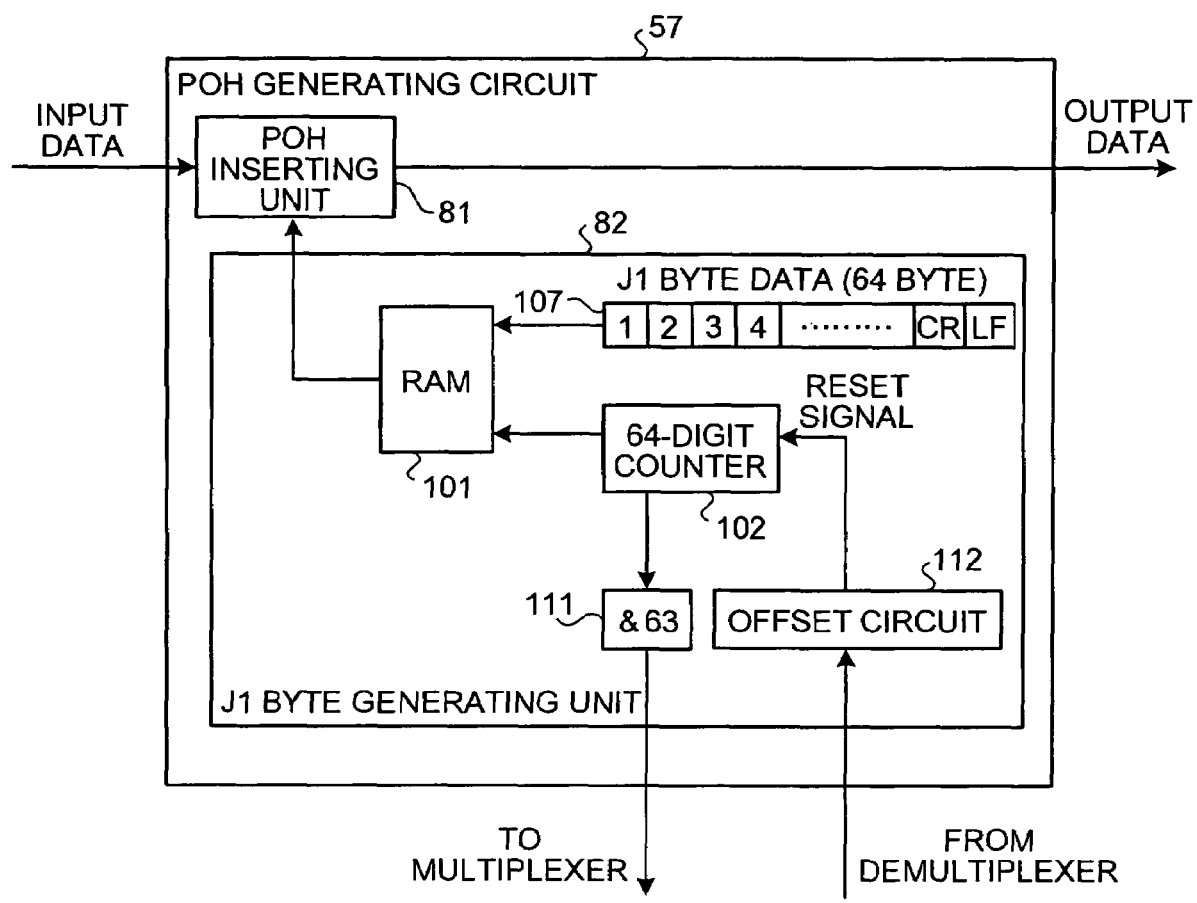
FIG. 9 is a schematic diagram for illustrating a second example of the configuration for producing identical J1 byte data.

FIG. 9 is a schematic diagram for illustrating a second example of the configuration for producing identical J1 byte data. As shown in FIG. 9, the second example is different from (3) First Example of Configuration for Producing Identical J1 Byte Data. The difference is that the J1 byte generating unit 82 does not have the offset circuit 103, the second buffer memory 104, the third buffer memory 105, and the selector 106, but has a fixed pattern detecting unit 111 and an offset circuit 112.

According to the specification of SONET GR-253, for example, a carriage return (CR) code and a line feed (LF) code are inserted in 63rd byte and 64th byte in a J1 path trace, respectively, to form a fixed pattern. The fixed pattern detecting unit 111 detects such a fixed pattern. In this example, the fixed pattern detecting unit 111 indicates detection of the fixed pattern when the address counter 102 registers "63", that is, reaches the final count. The fixed pattern detecting unit 111, however, may actually detect the CR code or the LF code. The detecting unit 111 generates a timing signal upon detecting the fixed pattern. The generated timing signal is sent to the multiplexer 84 (not shown; see FIG. 2).

The offset circuit 112 delays the timing of a timing signal sent from the demultiplexer 85 (not shown; see FIG. 2) by a given time. This delay time is equivalent to a signal transfer delay caused by a transfer path, such as a cable, that connects a plug-in card operating at the on-use side to a plug-in card operating at the spare side. The timing signal delayed by the offset circuit 112 is sent to the address counter 102 as a counter reset signal. Upon input of the counter reset signal, the address counter 102 resets a counter value.

Figure 10:
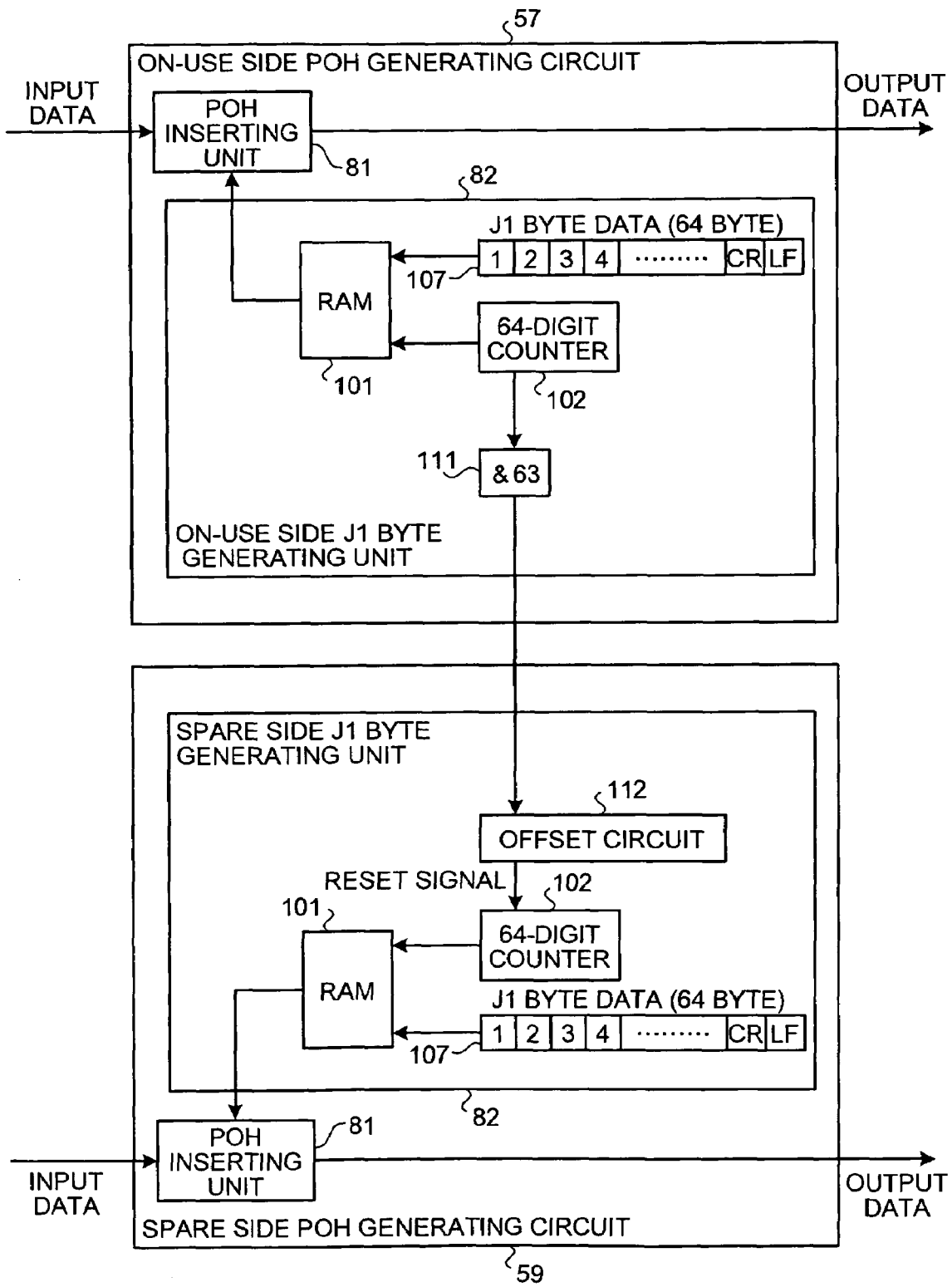
FIG. 10 is a schematic diagram for explaining an operation of the configuration shown in FIG. 9.

FIG. 10 is a schematic diagram for explaining an operation of the configuration shown in FIG. 9. As shown in FIG. 10, at the on-use side POH generating circuit 57, the fixed pattern detecting unit 111 puts out a timing signal to the spare side POH generating circuit 59 when the address counter 102 registers "63" or the detecting unit 111 detects a CR code. The spare side POH generating circuit 59 receives the timing signal from the on-use side POH generating circuit 57, and causes the offset circuit 112 to delay the timing signal by the time equivalent to the signal transfer delay, for example, the time for one frame to advance, to turn the timing signal into a counter reset signal.

At the spare side POH generating circuit 59, a counter rest signal resets the address counter 102. As a result, J1 byte data held in the first buffer memory 101 is put out sequentially with the data head first from the first buffer memory 101 to the POH inserting unit 81. Meanwhile, at the on-use side POH generating circuit 57, the first byte of J1 byte data held in the first buffer memory 101 is put out from the first buffer memory 101 to the POH inserting unit 81 at the same time when the first byte of the J1 byte data is put out at the spare side POH generating circuit 59.

Therefore, after output of the first byte, sequence start timing for the 64 bytes path trace is synchronized between the on-use side and the spare side, which results in the identical J1 byte data output both at on-use side and the spare side. Following output of the identical J1 byte data, the spare side POH generating circuit 59 monitors the cycle start timing of the address counter 102 and the timing signal sent from the on-use side POH generating circuit 57 to detect the no-coincidence of the sequence start timing between the on-use side and the spare side. Upon detection of the no-coincidence of the sequence start timing, counter reset is carried out again.

The spare side POH generating circuit 59 may dispense with the offset circuit 112, and allow the timing signal from the on-use side POH generating circuit 57 to directly reset the address counter 102 of spare side POH generating circuit 59. This is because that, since the on-use side POH generating circuit 57 and the spare side POH generating circuit 59 operate in synchronization at the same frequency of, for example, 8 KHz, resetting the address counter 102 of the spare side POH generating circuit 59 at the point of reception of the timing signal from the on-sue side POH generating circuit 57 by the spare side POH generating circuit 59 leads both on-sue side POH generating circuit 57 and spare side POH generating circuit 59 to simultaneously start processing the first byte of the J1 byte data at the count of the address counter 102 that is next to the resetting.

Figures 11, 12:
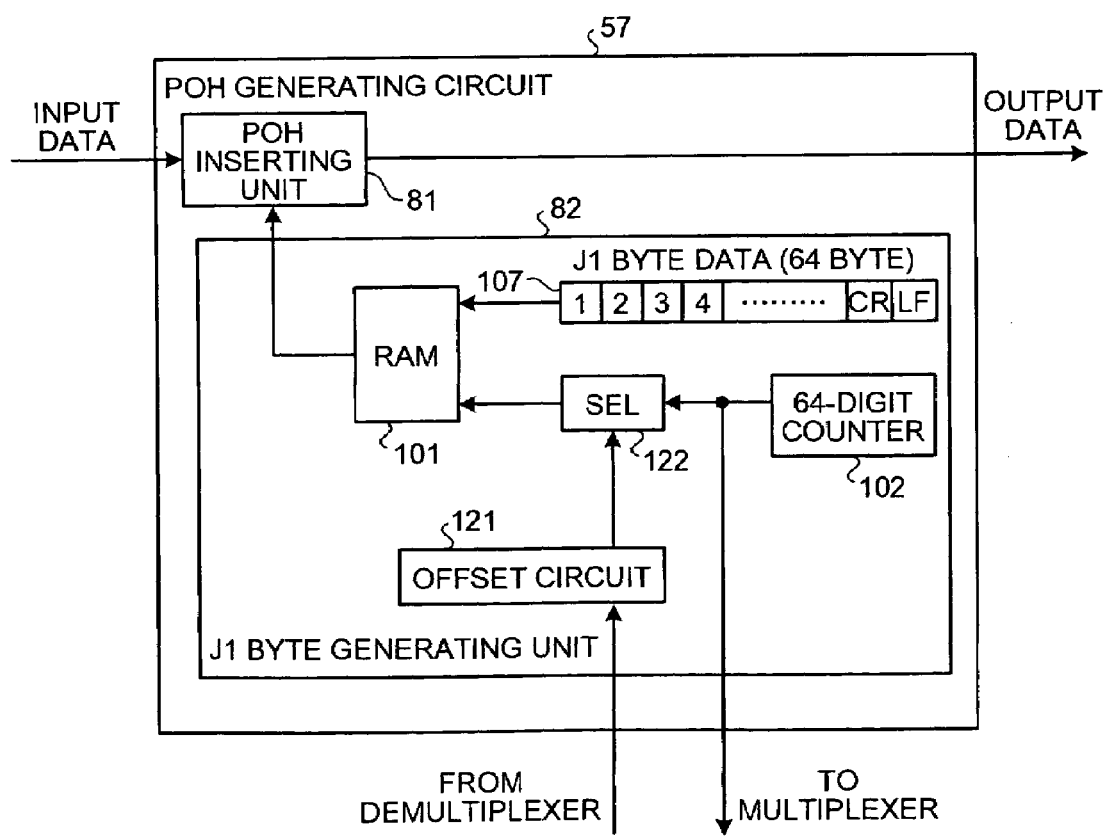
FIG. 11 is a schematic diagram of an identifier format specified in ITU-T G. 831.
FIG. 12 is a schematic diagram for illustrating a third example of a configuration for producing identical J1 byte data.

A timing element for J1 byte data other than a fixed pattern made by a CR code or a LF code may be used. For example, a specific Nth byte (N is a natural number) is used as an timing element. This conforms to a path trace format specified in ITU-T G.707. G.707 specification includes a 64 bytes free format string, and a 16-byte access point identifier format 113 specified in G.831, as shown in FIG. 11, or a 64-byte access point identifier format that is four times the access point identifier format 113. In the case of the 64-byte free format string, a specific Nth byte is used as a timing element. In the case of the access point identifier format 113 specified in G.831, an F1 byte country code is used as a timing element.

(5) Third Example of Configuration for Producing Identical J1 Byte Data

FIG. 12 is a schematic diagram for illustrating a configuration for producing identical J1 byte data. As shown in FIG. 12, the third example is different from (3) First Example of Configuration for Producing Identical J1 Byte Data. The difference is that the J1 byte generating unit 82 does not have the offset circuit 103, the second buffer memory 104, the third buffer memory 105, and the selector 106, but has an offset circuit 121, and a selector 122.

An address issued from the address counter 102 is sent to the selector 122 and the multiplexer 84 (not shown; see FIG. 2). The offset circuit 121 adds an offset value to an address value sent from demultiplexer 85 (not shown; see FIG. 2). This offset value is equivalent to a signal transfer delay caused by a transfer path, such as a cable, that connects a plug-in card operating at the on-use side to a plug-in card operating at the spare side.

The selector 122 selects the address sent from the address counter 102 when the POH generating circuit 57 operates at the on-use side, while selecting the address to which the offset value is added by the offset circuit 121 when the POH generating circuit 57 operates at the spare side. The address selected by the selector 122 is sent to the first buffer memory 101 as an address for reading J1 byte data out of the first buffer memory 101.

Figure 13:
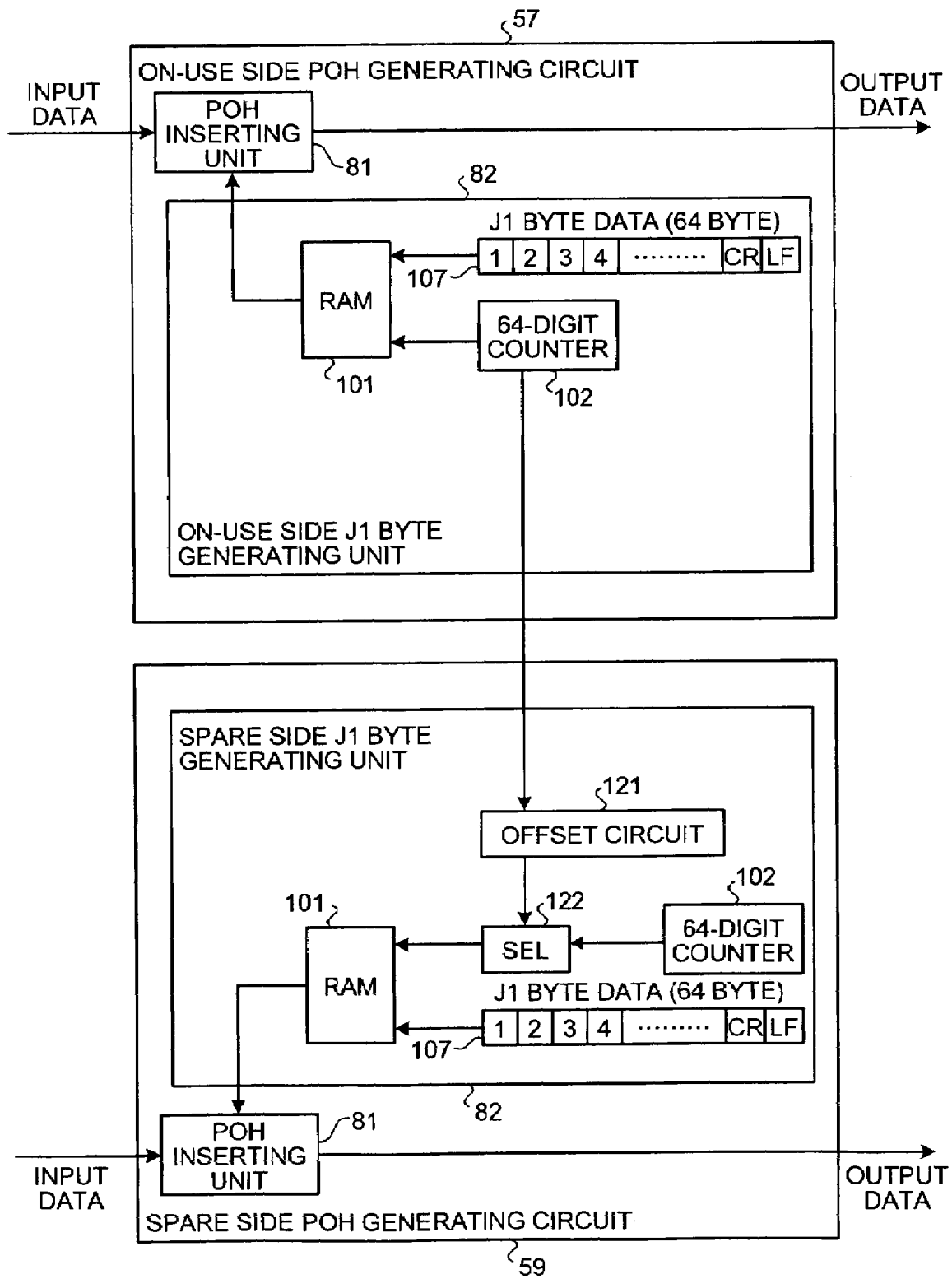
FIG. 13 is a schematic diagram for explaining an operation of the configuration shown in FIG. 12.

FIG. 13 is a schematic diagram for explaining an operation of the configuration shown in FIG. 12. At the on-use side POH generating circuit 57, as shown in FIG. 13, the first buffer memory 101 sequentially puts out the J1 byte data with the data head first based on an address value put out of the address counter 102. At the same time, the on-use side POH generating circuit 57 sends the address to the spare side POH generating circuit 59.

At the spare side POH generating circuit 59, the offset circuit 121 adds the offset value to the address value sent from the on-use side POH generating circuit 57. The selector 122 in the spare side POH generating circuit 59 then selects the address to which the offset value is added by the offset circuit 121. As a result, at the spare side POH generating circuit 59, the J1 byte data is read out of the first buffer memory 101 using the same address (counter value) as used at the on-use side POH generating circuit 57, thus the J1 byte data become identical both at on-use side and the spare side.

The on-use side POH generating circuit 57 may adds the offset value to a counter value of the address counter 102 to provide an address, which is send to the spare side POH generating circuit 59. In this case, at the spare side POH generating circuit 59, the J1 byte data is read directly out of the first buffer memory 101 based on the address sent from the on-use side POH generating circuit 57.

(6) Fourth Example of Configuration for Producing Identical J1 Byte Data

Figure 14:
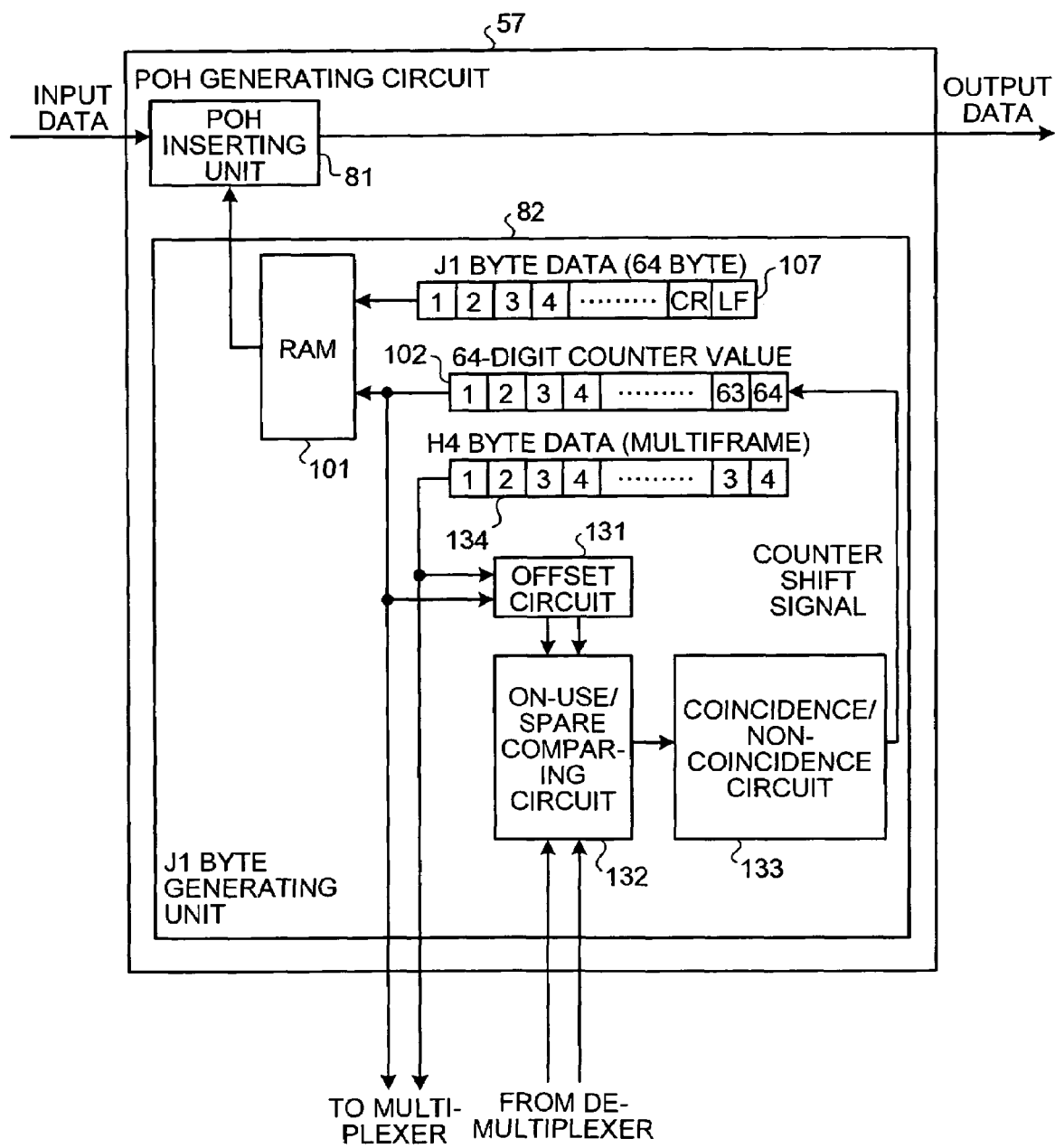
FIG. 14 is a schematic diagram for illustrating a fourth example of a configuration for producing identical J1 byte data.

FIG. 14 is a schematic diagram for illustrating a fourth example of a configuration for producing identical J1 byte data. As shown in FIG. 14, the fourth example is different from (3) First Example of Configuration for Producing Identical J1 Byte Data. The difference is that the J1 byte generating unit 82 does not have the offset circuit 103, the second buffer memory 104, the third buffer memory 105, and the selector 106, but has an offset circuit 131, an on-use/spare comparing circuit 132, and a coincidence/no-coincidence circuit 133.

For example, according to GR-253 specification, when the main signal is VT-Structured STS-1, the 7th bit and 8th bit of H4 byte data 134 (hereinafter, "H4 byte-bit 7, 8") represent VT sequence numbers of 1 to 4. The H4 byte-bit 7, 8 is, therefore, considered to be a 4-digit counter having a cycle of 4 frames (500 μsec). This allows a process of monitoring a combination of an address counter value and a H4 byte bit-7, 8 value at the on-use side and the spare side and executing control to produce the identical address counter value both at on-use side and spare side.

An address value issued from the address counter 102 and an H4 byte-bit 7, 8 value are sent to the offset circuit 131 and the multiplexer 84 (not shown; see FIG. 2). The offset circuit 131 adds a given offset value to the address value issued from the address counter 102 and to the H4 byte-bit 7, 8 value. This offset value is equivalent to a signal transfer delay caused by a transfer path, such as a cable, that connects a plug-in card operating at the on-use side to a plug-in card operating at the spare side.

The on-use/spare comparing circuit 132 compares an address value and an H4 byte-bit 7, 8 value, which are sent via the demultiplexer 85 (not shown; see FIG. 2), with the address value and the H4 byte-bit 7, 8 value, to which the offset value is added by the offset circuit 131, respectively. The coincidence/no-coincidence circuit 133 checks the result of comparison by the on-use/spare comparing circuit 132 to see the coincidence or no-coincidence of the address value and the offset address value, and of the H4 byte-bit 7, 8 values and the offset H4 byte-bit 7, 8 values. When confirming no-coincidence, the coincidence/no-coincidence circuit 133 puts out an address shift signal to the address counter 102. Upon receiving the counter shift signal from the coincidence/no-coincidence circuit 133, the address counter 102 puts a counter value back or forward by a given value M, where M is a positive integer.

Figure 15:
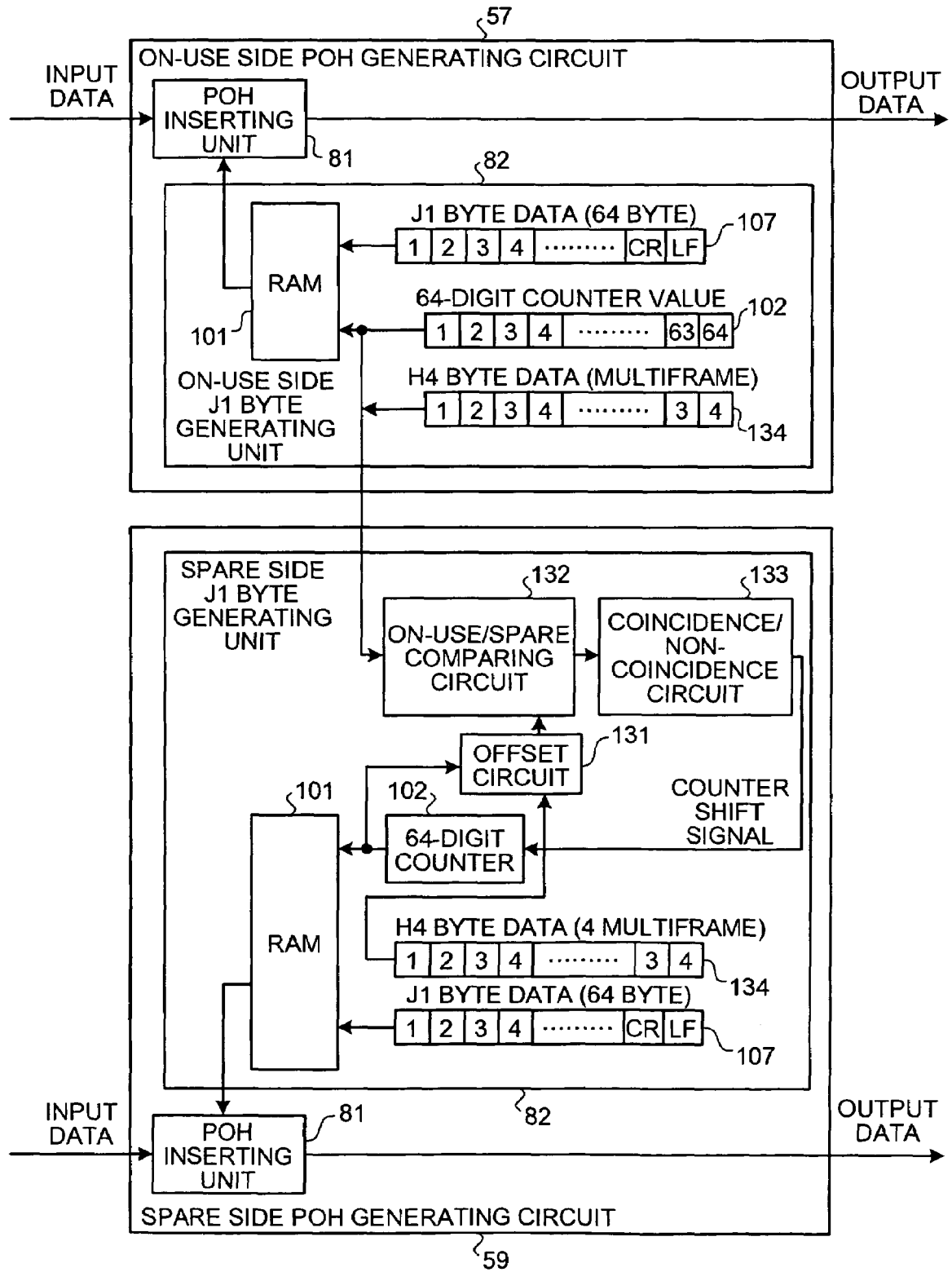
FIG. 15 is a schematic diagram for explaining an operation of the configuration shown in FIG. 14.
Figure 16:
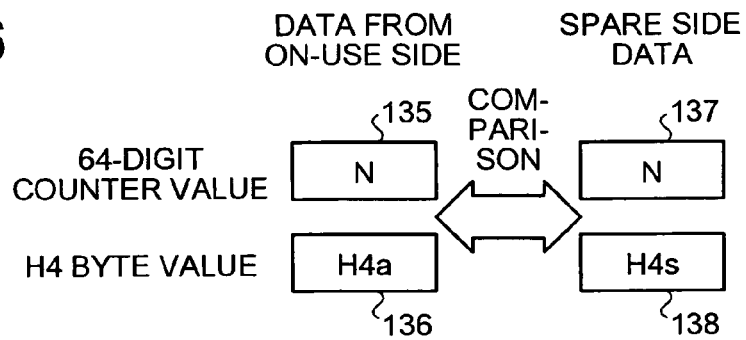
FIG. 16 is a schematic diagram for explaining an operation of an on-use/spare comparing circuit.

FIG. 15 is an schematic diagram for explaining an operation of the configuration shown in FIG. 14. FIG. 16 is a schematic diagram for explaining an operation of the on-use/ spare comparing circuit. At the on-use side POH generating circuit 57, as shown in FIG. 15, the first buffer memory 101 puts out J1 byte data sequentially with the data head first based on an address value put out of the address counter 102. At the same time, the on-use side POH generating circuit 57 sends the address value N135 and an H4 byte bit-7, 8 value H4a 136 to the spare side POH generating circuit 59.

At the spare side POH generating circuit 59, the offset circuit 131 adds an offset value to an address value put out of the address counter 102 and to an H4 byte bit-7, 8 value to produce a spare side address value N137 and a spare side H4 byte bit-7, 8 value H4s 138. The on-use side address value N135 and the on-use side H4 byte bit-7, 8 value H4a 136 are then compared with the spare side address value N137 and the spare side H4 byte bit-7, 8 value H4s 138, respectively, at the spare side POH generating circuit 59.

At the spare side POH generating circuit 59, when the no-coincidence between the compared address values and H4 byte bit-7, 8 values is detected after the comparison, a counter shift signal is given to the address counter 102 to put a counter value back or forward by the given value M. This causes J1 byte data read out of the first buffer memory 101 to shift back or forward by M frames at the spare side POH generating circuit 59. Subsequently, the same comparison between address values (counter values) and H4 byte bit-7, 8 values is repeated.

At the spare side POH generating circuit 59, the above comparison and data shift is repeated to read the J1 byte data out of the first buffer memory 101 by using the same address (counter value) as used at the on-use side POH generating circuit 57. As a result, the identical J1 byte data is produced both at the on-use side and the spare side. The number of frames M for every shift may be simply set to "1", or may be a combination of "4", which is one cycle of sequence numbers, and a difference (1 to 3) between spare side sequence numbers and on-use side sequence numbers.

According to the fourth example, a timing shift between the on-use side and the spare side can be calculated in terms of the number of frames (H4s-H4a) by comparing H4 byte bit-7, 8 values H4a and H4s at the on-use side and spare side when the same address value N is used at both sides. The operation of the fourth example permits process time scattering of up to 500 μsec.

The on-use side POH generating circuit 57 may add the offset value to the address value N135 and to the H4 byte-bit 7, 8 value H4a 136, and sends the offset address value N135 and H4 byte-bit 7, 8 value H4a 136 to the spare side POH generating circuit 59. In this case, the spare side POH generating circuit 59 does not add the offset value but receives the offset address value and H4 byte-bit 7, 8 value from the on-use side POH generating circuit 57 as the spare side address value N137 and the spare side H4 byte-bit 7, 8 value H4s 138. Address values may be replaced with J1 byte data in the forth example. A combination of J14 byte data and H4 byte-bit 7, 8 values may be compared by the on-use/spare comparing circuit 132.

(7) Fifth Example of Configuration for Producing Identical J1 Byte Data

Figure 17:
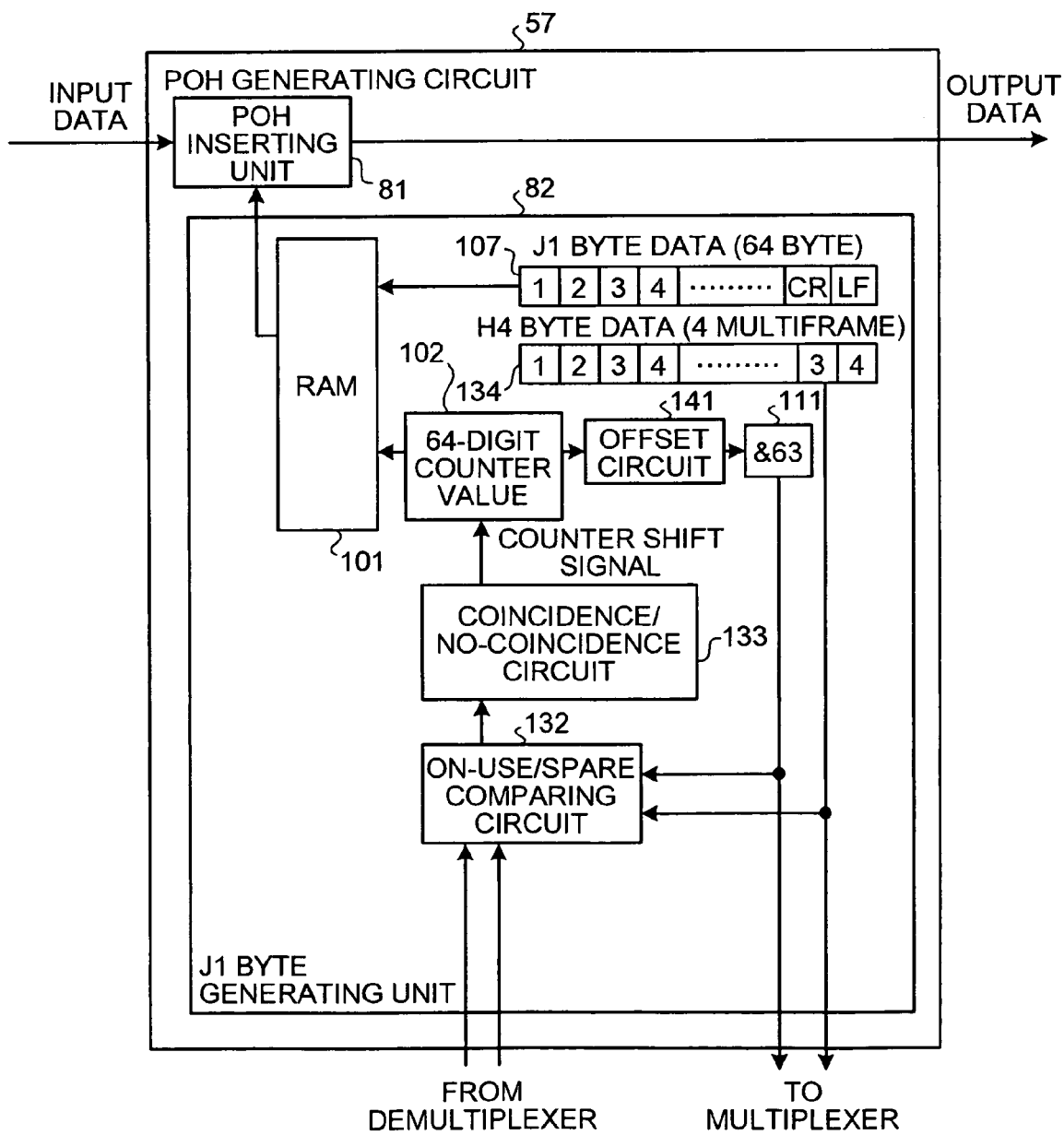
FIG. 17 is a schematic diagram for illustrating a fifth example of a configuration for producing identical J1 byte data.

FIG. 17 is schematic diagram for illustrating a fifth example of a configuration for producing identical J1 byte data. As shown in FIG. 17, the fifth example is different from (3) First Example of Configuration for Producing Identical J1 Byte Data. The difference is that the J1 byte generating unit 82 does not have the offset circuit 103, the second buffer memory 104, the third buffer memory 105, and the selector 106, but has an offset circuit 141, the fixed pattern detecting unit 111, the on-use/spare comparing circuit 132, and the coincidence/no-coincidence circuit 133.

The offset circuit 141 gives a counter value of the address counter 102 directly to the fixed pattern detecting unit 111 when the POH generating circuit 57 operates at the on-use side, while adds a given offset value to the counter value and gives the offset counter value to the fixed pattern detecting unit 111 when the POH generating circuit 57 operates at the spare side. Based on the address value (counter value) given by the offset circuit 141, the fixed pattern detecting unit 111 detects a fixed pattern in a J1 path trace. The detail of the fixed pattern detecting unit 111 is the same as described in (4) Second Example of Configuration for Producing Identical J1 Byte Data. The detail of the on-use/spare comparing circuit 132 and the coincidence/no-coincidence circuit 133 is the same as described in (6) Fourth Example of Configuration for Producing Identical J1 Byte Data.

Like the above fourth example, the fifth example applies to the MPSS apparatus that uses the main signal of VT-Structured STS-1. According to the fifth example, a combination of a timing signal, which is generated by the fixed pattern detecting unit 111 upon detection of a fixed pattern, and an H4 byte-bit 7, 8 value is monitored at the on-use side and the spare side. Control is then executed to produce the identical counter value at both on-use side and spare side. Accordingly, a timing signal generated by the fixed pattern detecting unit 111 and an H4 byte-bit 7, 8 value are sent to the on-use/spare comparing circuit 132 and the multiplexer 84 (not shown; see FIG. 2).

The on-use/spare comparing circuit 132 compares a timing signal and an H4 byte-bit 7, 8 value, which are sent via the demultiplexer 85 (not shown; see FIG. 2), with the timing signal sent from the fixed pattern detecting unit 111 and the H4 byte-bit 7, 8 value, respectively. The address counter 102 receives a counter shift signal from the coincidence/no-coincidence circuit 133 and shifts a counter value by M when the on-use/spare comparing circuit 132 gives a result of no-coincidence.

Figure 18:
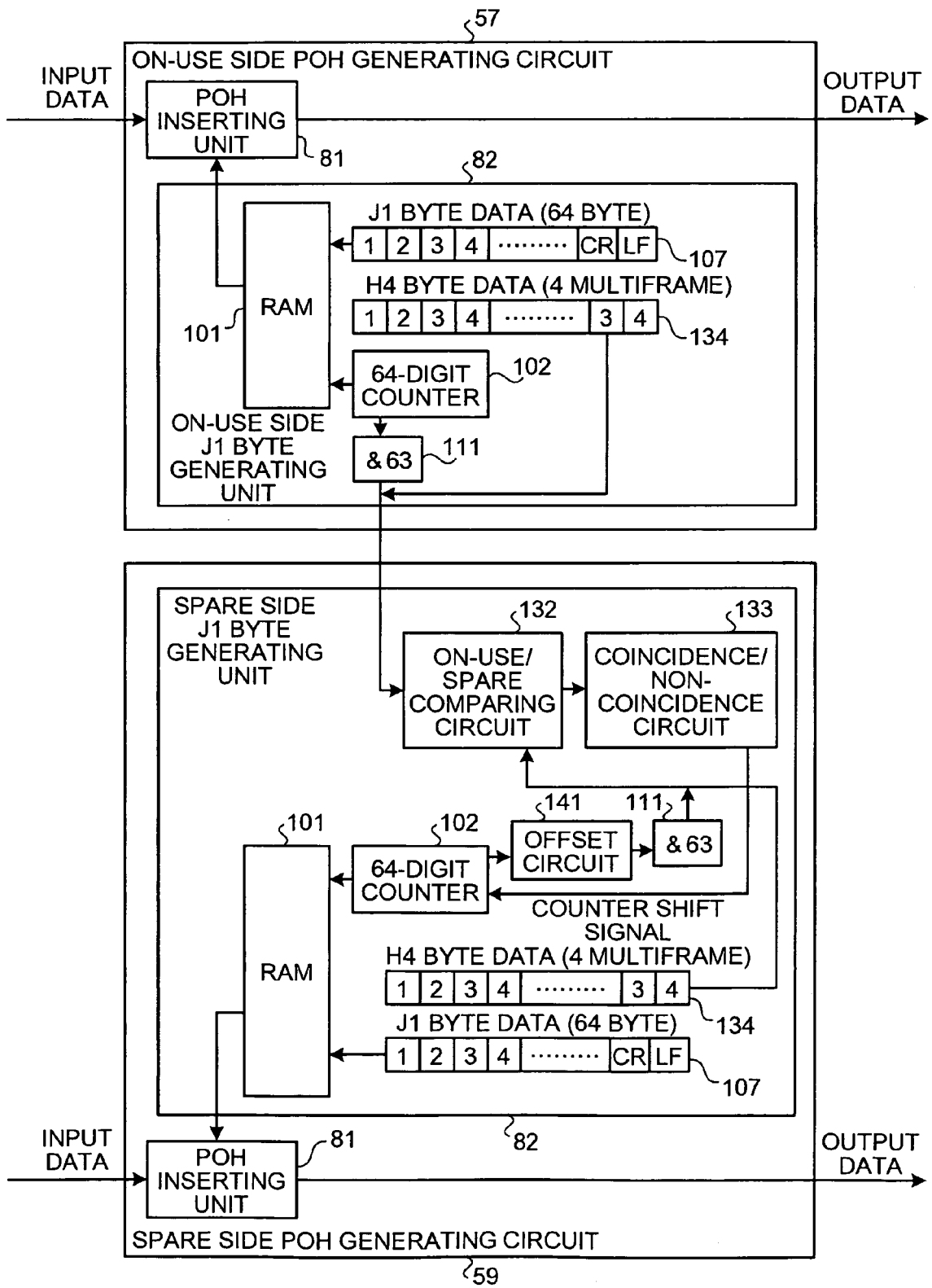
FIG. 18 is a schematic diagram for explaining an operation of the configuration shown in FIG. 17.

FIG. 18 is a schematic diagram for explaining an operation of the configuration shown in FIG. 17. At the on-use side POH generating circuit 57, as shown in FIG. 18, the first buffer memory 101 puts out J1 byte data sequentially with the data head first on the basis of an address value put out of the address counter 102. When the fixed pattern detecting unit 111 detects a fixed pattern in a J1 path trace, the on-use side POH generating circuit 57 sends a timing signal and an H4 byte bit-7, 8 value to the spare side POH generating circuit 59.

At the spare side POH generating circuit 59, the offset circuit 141 adds the offset value to an address value put out of the address counter 102, and the fixed pattern detecting unit 111 detects a fixed pattern in a J1 trace path based on the address value to which the offset value is added. At the spare side POH generating circuit 59, a timing signal and an H4 byte-bit 7, 8 value are sent to the on-use/spare comparing circuit 132 when the fixed pattern detecting unit 111 detects the fixed pattern in the J1 trace path.

At the spare side POH generating circuit 59, the on-use/spare comparing circuit 132 compares the on-use side timing signal and the on-uses side H4 byte-bit 7, 8 value with the spare side timing signal and the spare side H4 byte-bit 7, 8 value, respectively. The operation ensuing from this point is the same as described in (6) Fourth Example of Configuration for Producing Identical J1 Byte Data. The operation of the fifth example permits process time scattering of up to 500 μsec. The amount of a shift M in a counter value is the same as described in (6) Fourth Example of Configuration for Producing Identical J1 Byte Data.

Each of the following configuration examples applies to (1) First Example of Global configuration of POH Generating Circuit.

(8) First Example of Configuration for Producing Identical B3 Byte Data

Figure 19:
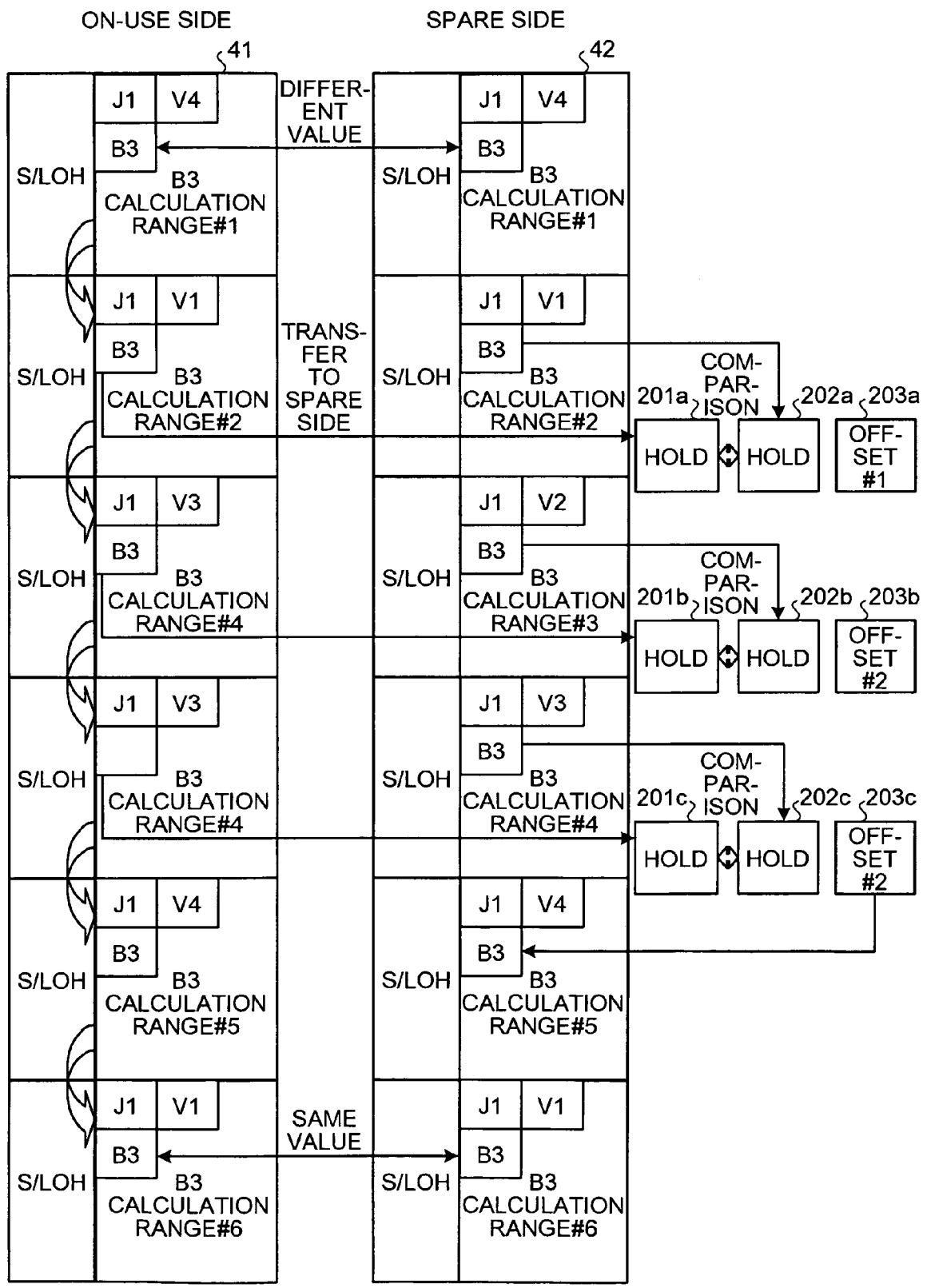
FIG. 19 is a schematic diagram for explaining a first example of a configuration for producing identical B3 byte data.

FIG. 19 is a schematic for explaining a first example of a configuration for producing identical B3 byte data. As shown in FIG. 19, according to the first example, B3 byte calculation results 201$a$, 201$b$, 201$c$ on on-use side data 41 are sent to the spare side. The spare side holds the B3 byte calculation results 201$a$, 201$b$, 201$c$ sent from the on-use side, and also holds calculation results 202$a$, 202$b$, and 202$c$ on spare side data 42. The following description is made on the assumption, but without limitation, that the on-use side and the spare side each holds B3 byte calculation results for three frames.

At the spare side, the B3 byte calculation results 201$a$, 201$b$, 201$c$ on the on-use side data 41 are compared with the calculation results 202$a$, 202$b$, 202$c$ on the spare side data 42, respectively, and each difference (offset value) between the calculation results 201$a$ and 202$a$, between 201$b$ and 202$b$, and between 201$c$ and 202$c$ is calculated to yield three offset values 230$a$, 203$b$, 203$c$. When the three offset values are identical, the identical offset value is defined as a correction value, and is reflected on a B3 insertion value for the next frame at the spare side.

After the reflection of the correction value at the spare side, B3 byte calculation is repeated on the same data both at on-use side and spare side. As a result, the identical B3 byte calculation results are kept produced both at on-use side and spare side until the next main signal error occurs. By calculating the differences between on-use side B3 byte calculation results and spare side B3 byte calculation results for a series of frames, a right correction value can be reflected on a B3 insertion value at the spare side even if an error in data transfer from the on-use side to the spare side occurs.

Figure 20:
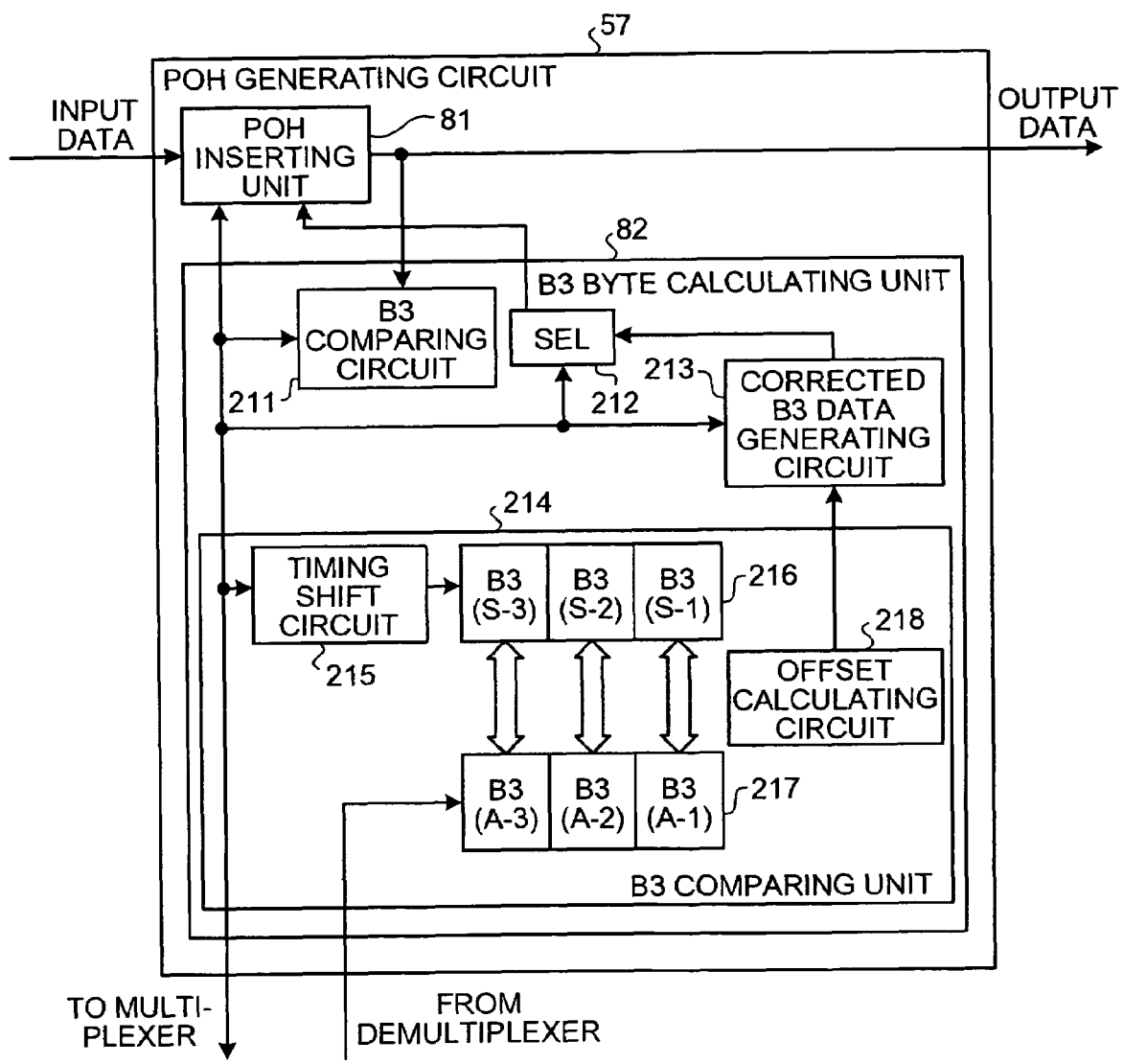
FIG. 20 is a schematic diagram for illustrating a first example of the configuration for producing identical B3 byte data.

FIG. 20 is a schematic diagram for illustrating the first example of the configuration for producing identical B3 byte data. As shown in FIG. 20, a B3 byte calculating unit 83 includes a B3 calculating circuit 211, a selector 212, a corrected B3 data generating circuit 213, and a B3 comparing unit 214. The B3 comparing unit 214 has a timing shift circuit 215, a spare side B3 calculating result holding memory 216, an on-use side B3 calculating result holding memory 217, and an offset calculating circuit 218.

The B3 calculating circuit 211 executes B3 byte calculation based on a calculation result from a B3 calculation range in the previous frame. B3 byte calculation results are sent to the POH inserting unit 81 and the multiplexer 84 (not shown; see FIG. 2), and also to the selector 212, the timing shift circuit 215, and the corrected B3 data generating circuit 213. The timing shift circuit 215 shifts the timing of the B3 byte calculation results by a given time, and gives the shifted calculation results to the spare side B3 calculating result holding memory 216. The amount of shift of the timing is equivalent to a signal transfer delay caused by a transfer path, such as a cable, that connects a plug-in card operating at the on-use side to a plug-in card operating at the spare side.

The spare side B3 calculating result holding memory 216 holds, for example, B3 byte calculation results (B3 (S-1), B3 (S-2), B3 (S-3)) for three frames that are given by the timing shift circuit 215. The on-use side B3 calculating result holding memory 217 holds, for example, B3 byte calculation results (B3 (A-1), B3 (A-2), B3 (A-3)) for three frames that are sent from the demultiplexer 85 (not shown; see FIG. 2).

The offset calculating circuit 218 compares a plurality of B3 byte calculation results held in the spare side B3 calculating result holding memory 216 with a plurality of B3 byte calculation results held in the on-use side B3 calculating result holding memory 217 on the same frame basis, respectively, and calculates each offset value 203a, 203b, 203c from each compared calculation results for the same frame. When the offset values for three frames are identical, for example, the offset calculating circuit 218 defines the identical offset value as a correction value, and notifies the corrected B3 data generating circuit 213 of the corrected value.

The corrected B3 data generating circuit 213 corrects a B3 byte calculation result at the present point using the correction value notified of by the offset calculating circuit 218. The selector 212 selects a B3 byte calculation result put out of the B3 calculating circuit 211 when the POH generating circuit 57 operates at the on-use side, while selects a corrected B3 byte calculation result put out of corrected B3 data generating circuit 213 when the POH generating circuit 57 operates at the spare side. The POH inserting unit 81 inserts a B3 byte calculation result selected by the selector 212 into input data.

Figure 21:
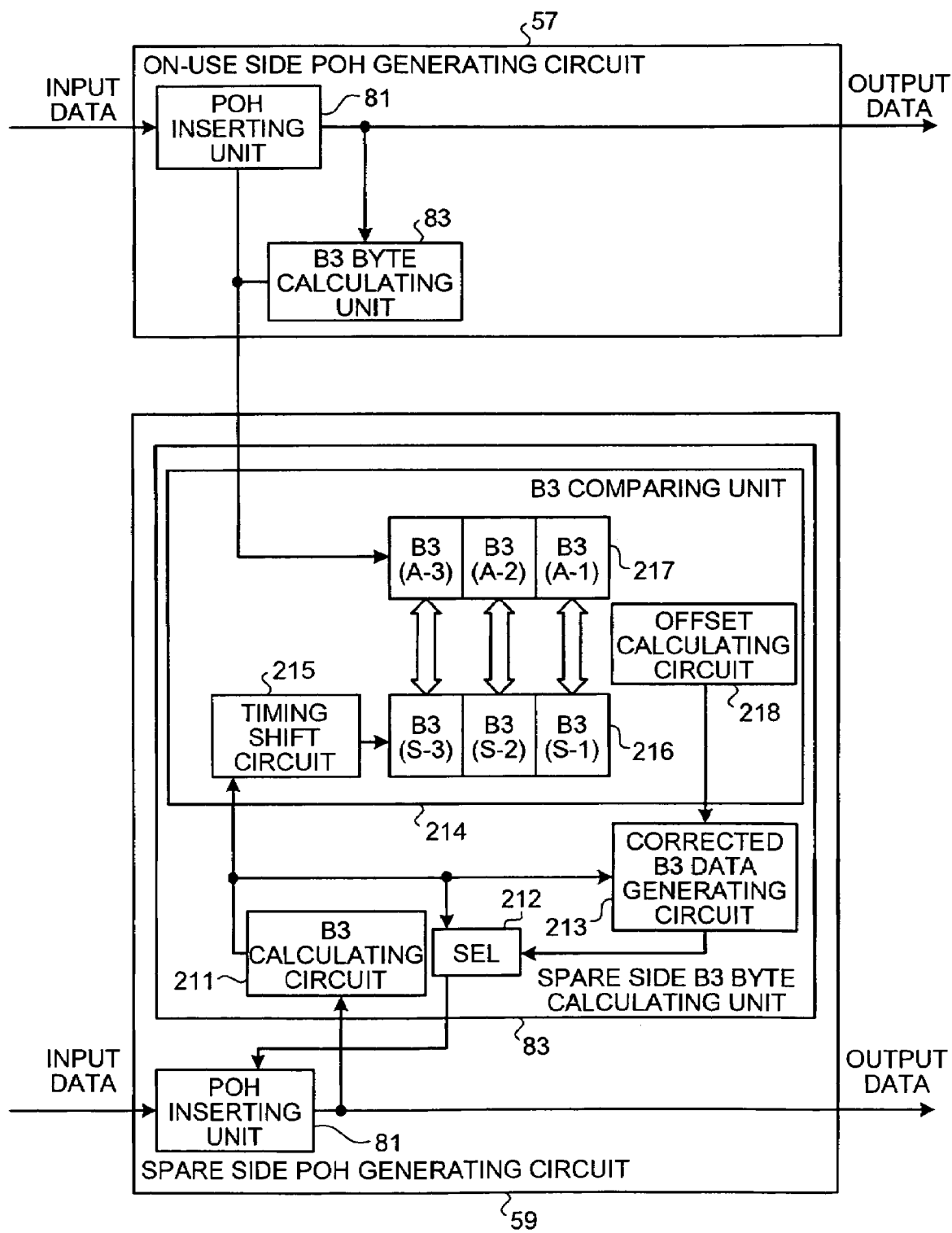
FIG. 21 is a schematic diagram for explaining an operation of the configuration shown in FIG. 20.
Figure 22:
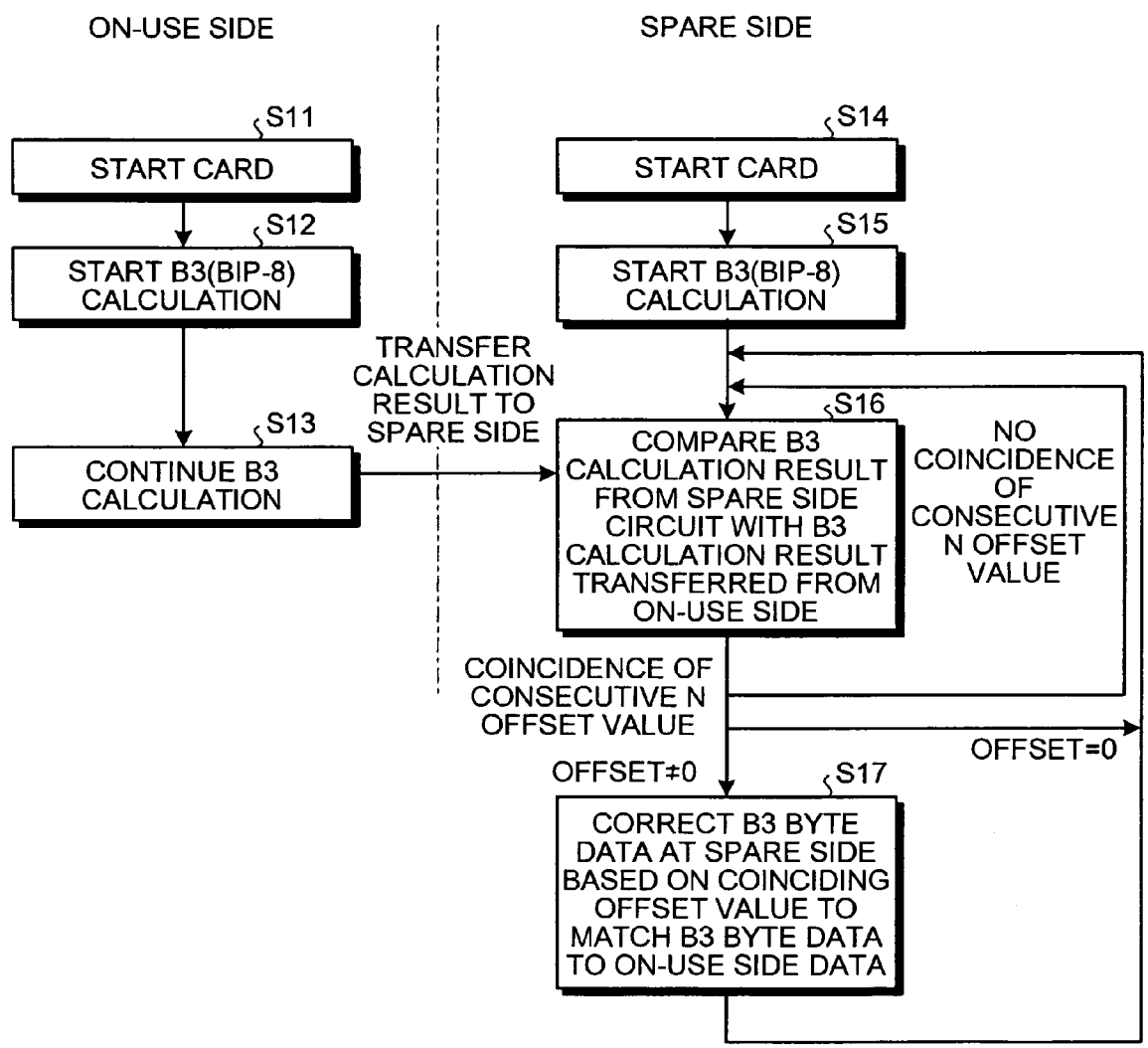
FIG. 22 is a flowchart of an operation for producing identical B3 byte data according to the configuration shown in FIG. 7.

FIG. 21 is a schematic diagram for explaining an operation of the configuration shown in FIG. 20. FIG. 22 is a flowchart of an operation for producing identical B3 byte data according to the configuration shown in FIG. 21. As shown in FIG. 21, when the on-use side plug-in card starts (step S11), the B3 byte calculating unit 83 starts B3 byte calculation at the on-use side POH generating circuit 57 (step S12). At the on-use side POH generating circuit 57, the B3 byte calculating unit 83 continues B3 byte calculation to put out B3 byte calculation results. The B3 byte calculation results put out of the B3 byte calculating unit 83 are sent to the spare side POH generating circuit 59 (step S13).

Meanwhile, when the spare side plug-in card starts (step S14), the B3 calculating circuit 211 starts B3 byte calculation at the spare side POH generating circuit 59 (step S15). At the spare side POH generating circuit 59, the timing shift circuit 215 shifts the timing of the B3 byte calculation results put out of the B3 calculating circuit 211, and the spare side B3 calculating result holding memory 216 holds the shifted B3 byte calculation results. Also at the spare side POH generating circuit 59, the on-use side B3 calculating result holding memory 217 holds the B3 byte calculation results sent from the on-use side POH generating circuit 57.

At the spare side POH generating circuit 59, the offset calculating circuit 218 compares the B3 byte calculation results, for example, for three frames held in the spare side B3 calculating result holding memory 216 with the B3 byte calculation results, for example, three frames held in the on-use side B3 calculating result holding memory 217 to calculates, for example, three offset values 203a, 203b, 203c (step S16). For example, when the offset values 203a, 203b, 203c for three frames are not identical, the procedure flow returns to step S16, at which the calculation result comparison and offset value calculation are repeated until the offset values become identical.

For example, at the spare side POH generating circuit 59, when the offset values 203a, 203b, 203c for three frames are identical and the identical offset value is not 0, the corrected B3 data generating circuit 213 corrects a B3 byte calculation result at the present point using the offset value as a correction value (step S17). The procedure flow then returns to step S16. When the on-use side B3 byte calculation results and the spare side B3 byte calculation results are identical on the same frame basis, each of the offset values 203a, 203b, 203c for three frames becomes 0. In this case, no correction process is carried out, and the procedure flow returns to step 16, at which offset value monitoring continues.

When the identical offset value becomes a value other than 0, the procedure flow proceeds to step S17, at which a B3 byte calculation result is corrected. Thus, a B3 byte calculation result to be inserted into spare side input data in the spare side POH generating circuit 59 becomes identical with a B3 byte calculation result to be inserted into on-use side input data in the on-use side POH generating circuit 57. The number of frames for checking the consecutive coincidence of offset values is not limited to 3, but can be adjusted to realize a protective function that offers optimum error resistance against data transfer error, etc.

(9) Second Example of Configuration for Producing Identical B3 Byte Data

Figure 23:
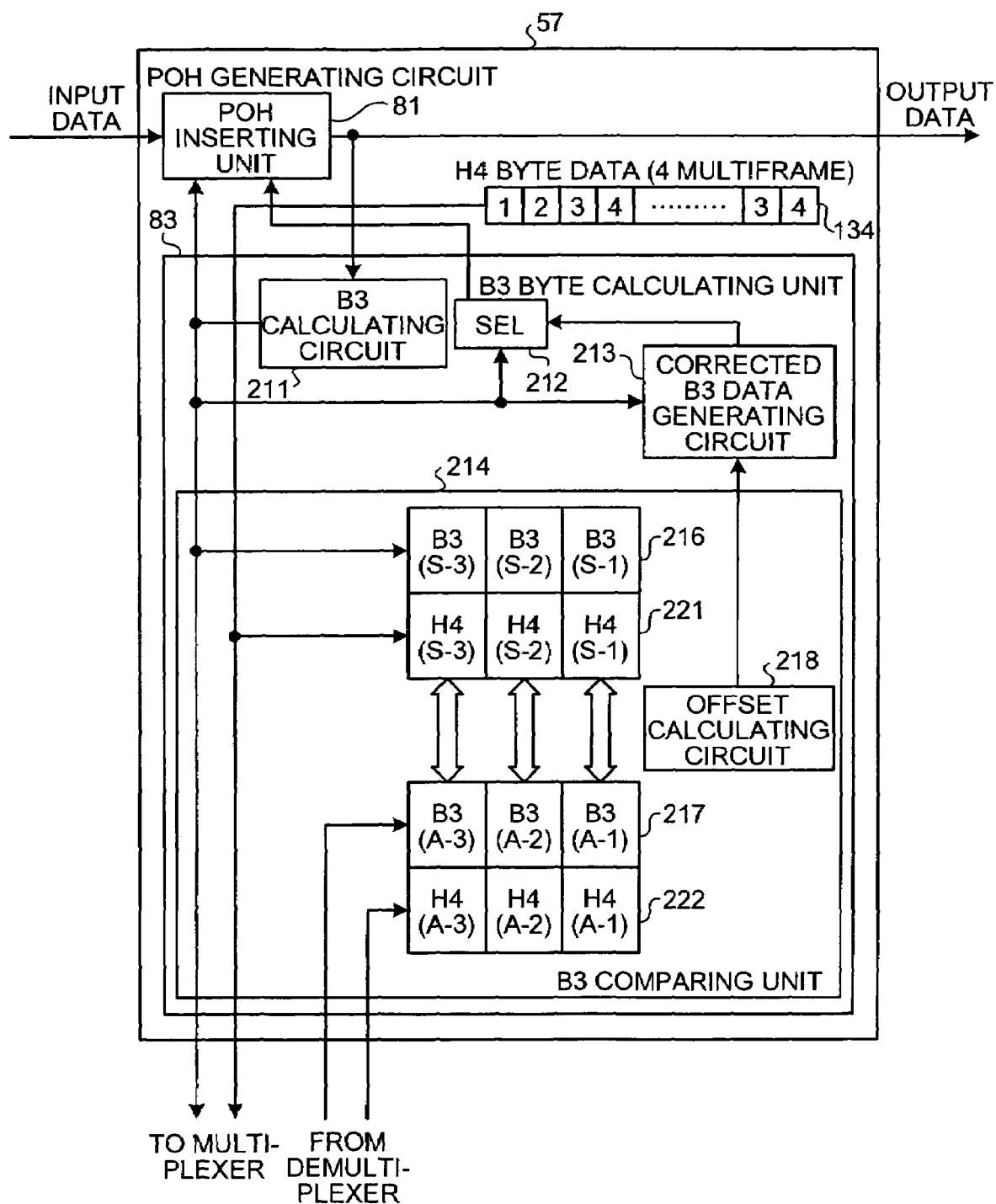
FIG. 23 is a schematic diagram for illustrating a second example of the configuration for producing identical B3 byte data.

FIG. 23 is a schematic diagram for illustrating a second example of the configuration for producing identical B3 byte data. As shown in FIG. 23, the second example is different from (8) First Example of Configuration for Producing Identical B3 Byte Data. The difference is that the B3 comparing unit 214 does not have the timing shift circuit 215, but has a spare side H4 byte holding memory 221, and an on-use side H4 byte holding memory 222. The second example applies to the MSPP apparatus that uses the main signal of VT-Structured STS-1.

The spare side H4 byte holding memory 221 holds the H4 byte-bit 7, 8 values of H4 byte data 134. The H4 byte-bit 7, 8 values are sent to the multiplexer 84 (not shown; see FIG. 2). The on-use side H4 byte holding memory 222 holds H4 byte-bit 7, 8 values sent from the demultiplexer 85 (not shown; see FIG. 2). The following description is made on the assumption, but without limitation, that the on-use side and the spare side each holds B3 byte calculation results for three frames and H4 byte-bit 7, 8 values for three frames.

Figure 24:
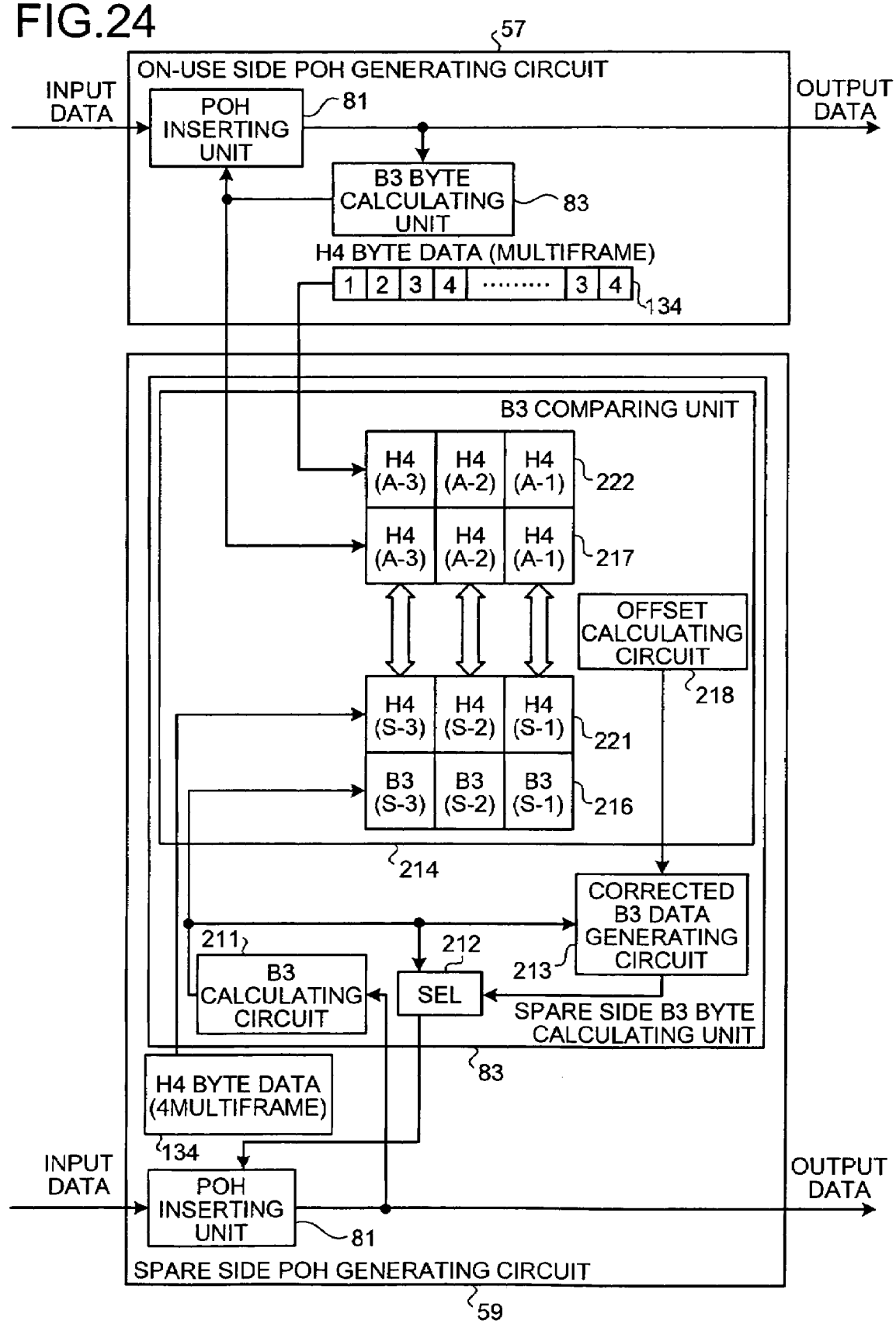
FIG. 24 is a schematic diagram for explaining an operation of the configuration shown in FIG. 23.

FIG. 24 is a schematic diagram for explaining an operation of the configuration shown in FIG. 23. As shown in FIG. 24, at the on-use side POH generating circuit 57, B3 byte calculation results put out of the B3 byte calculating unit 83 are sent to the POH inserting unit 81. Also at the on-use side POH generating circuit 57, the B3 byte calculation results and the H4 byte-bit 7, 8 values of the same frames for the B3 byte calculation results are sent to the spare side POH generating circuit 59. At the spare side POH generating circuit 59, the on-use side B3 calculation result holding memory 217 holds the B3 byte calculation results from the on-use side POH generating circuit 57, and the on-use side H4 byte holding memory 222 holds the H4 byte-bit 7, 8 values from the POH generating circuit 57.

At the spare side POH generating circuit 59, the spare side B3 calculation result holding memory 216 holds B3 byte calculation result put out of the B3 calculation circuit 211, and the spare side H4 byte holding memory 221 holds the H4 byte-bit 7, 8 values of the same frames for the B3 byte calculation results. The offset calculating circuit 218 at the spare side POH generating circuit 59 compares each set of B3 calculation results that have identical VT sequence numbers (H4 byte-bit 7, 8 value), one of which is held in the spare side H4 byte holding memory 221 and the other of which in the on-use side H4 byte holding memory 222. The comparison determines a correction value.

The way of calculating the correction value and an operation after the calculation is the same as described in (8) First Example of Configuration for Producing Identical B3 Byte Data. According to the second example, the time correspondence to on-use side data can be judged at the spare side. This reduces the circuit scale of the B3 comparing unit 214 or the amount of process to be executed by the B3 comparing unit 214. Identical B3 byte data, therefore, can be produced easily. The operation of the second example permits process time scattering of up to 500 μsec as the operation of (6) Fourth Example of Configuration for Producing Identical J1 Byte Data.

(10) Third Example of Configuration for Producing Identical B3 Byte Data

Figure 25:
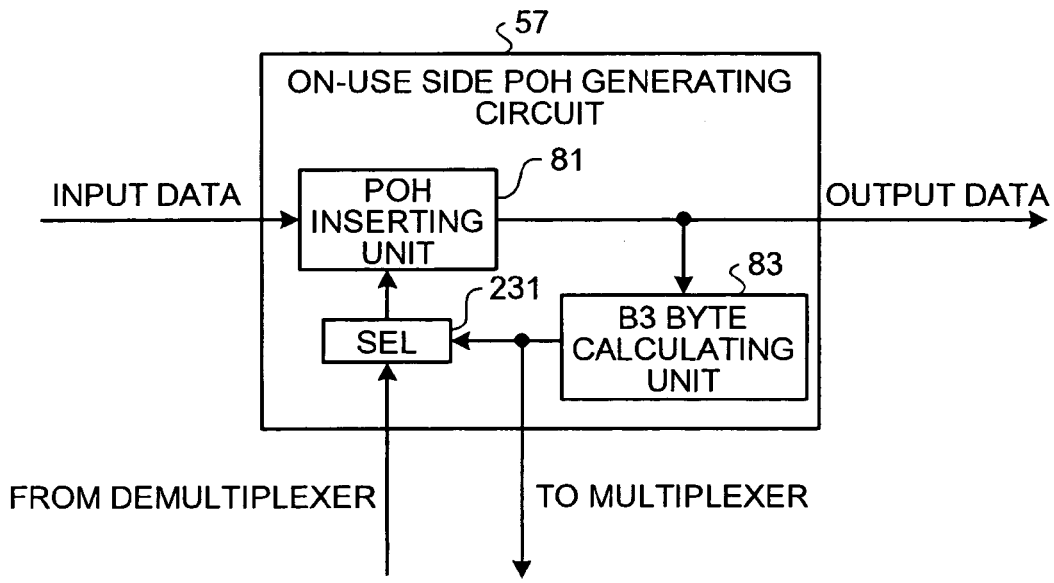
FIG. 25 is a schematic diagram for illustrating a third example of the configuration for producing identical B3 byte data.

FIG. 25 is a schematic diagram for illustrating a third example of the configuration for producing identical B3 byte data. As shown in FIG. 25, according to the third example, the on-use side POH generating circuit 57 includes the POH inserting unit 81, the B3 byte calculating unit 83, and a selector 231. According to GR-253 specification, a B3 byte is given as a BIP-8 calculation result on the previous frame.

This provides a time span to spare between the point that BIP-8 calculation is made on a frame and the point that a B3 byte, which is the result of the calculation, is inserted into input data. When one frame is, for example, 125 μsec, the time span is given by deducting a BIP-8 calculation time from 125 μsec. During the time span, a B3 byte value for the next frame at the on-use side is transferred from the on-use side to the spare side. The B3 byte calculating unit 83 executes B3 byte calculation based on output data from the POH inserting unit 81. A B3 byte calculation result given by the B3 byte calculating unit 83 is sent to the selector 231, and to the multiplexer 84 (not shown; see FIG. 2).

The selector 231 selects the B3 byte calculation result put out of the B3 byte calculating unit 83 when the POH generating circuit 57 operates at the on-use side, while selects a B3 byte calculation result sent from the demultiplexer 85 (not shown; see FIG. 2) when the POH generating circuit 57 operates at the spare side. The POH inserting unit 81 inserts a B3 byte calculation result selected by the selector 231 into input data.

Figure 26:
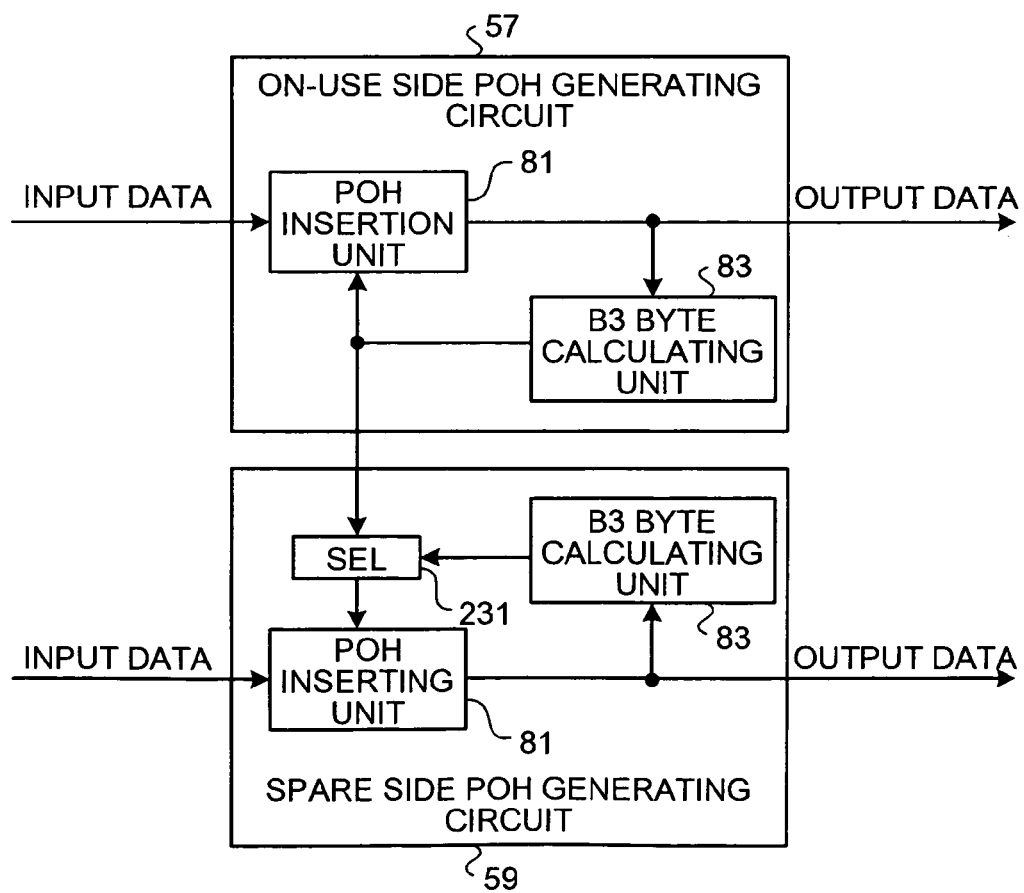
FIG. 26 is a schematic diagram for explaining an operation of the configuration shown in FIG. 25.

FIG. 26 is a schematic diagram for explaining an operation of the configuration shown in FIG. 25. As shown in FIG. 26, at the on-use side POH generating circuit 57, a B3 byte calculation result put out of the B3 byte calculating unit 83 is sent to the POH inserting unit 81 and to the spare side POH generating circuit 59. At the spare side POH generating circuit 59, the selector 231 selects the B3 byte calculating result sent from the on-use side POH generating circuit 57, and sends the selected B3 byte calculating result to POH inserting unit 81. In this manner, the spare side POH generating circuit 59 uses the B3 byte result that is sent from the on-use side POH generating circuit 57 during the time span. This enables the production of the identical B3 byte calculation result both at on-use side and spare side.

(11) Fourth Example of Configuration for Producing Identical B3 Byte Data

Figure 27:
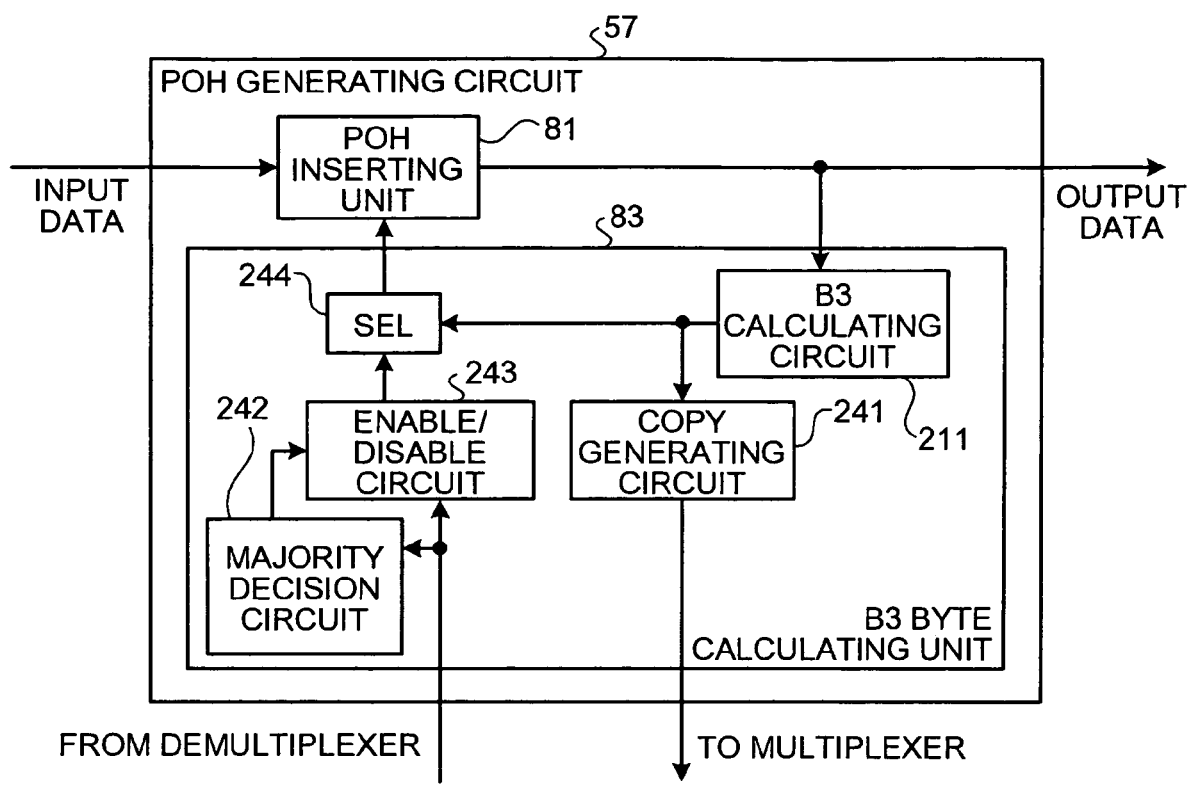
FIG. 27 is a schematic diagram for illustrating a fourth example of the configuration for producing identical B3 byte data.

FIG. 27 is a schematic diagram for illustrating a fourth example of the configuration for producing identical B3 byte data. As shown in FIG. 27, the fourth example is different from (10) Third Example of Configuration for Producing Identical B3 Byte Data. The difference is that the on-use side POH generating circuit 57 does not include the selector 231, and the B3 byte calculating unit 83 has the B3 calculating circuit 211, a copy generating circuit 241, a majority decision circuit 242, an enable/disable circuit 243, and a selector 244.

The copy generating circuit 241 generates copies of a B3 byte calculation result put out of the B3 calculating circuit 211 to provide a plurality of B3 byte calculation results of the same value. The B3 byte calculation results of the same value are sent simultaneously to the multiplexer 84 (not shown; see FIG. 2). The majority decision circuit 242 makes a majority decision judgment on a plurality of B3 byte calculation results sent simultaneously from the demultiplexer 85 (not shown; see FIG. 2) when the B3 byte calculation results do not have the same value, and adopts a value decided on by majority as a normal value.

When each of the B3 byte calculation results sent simultaneously from the demultiplexer 85 (not shown; see FIG. 2) has the same value, the enable/disable circuit 243 gives the same value to the selector 244. When the B3 byte calculation results from the demultiplexer 85 do not have the same value, the enable/disable circuit 243 gives the value adopted by the majority decision circuit 242 to the selector 244. The selector 244 selects the B3 byte calculation result put out of the B3 calculating circuit 211 when the POH generating circuit 57 operates at the on-use side, while selects the B3 calculation result from the enable/disable circuit 243 when the POH generating circuit 57 operates at the spare side. The POH inserting unit 81 inserts a B3 byte calculation result selected by the selector 244 into input data.

Figure 28:
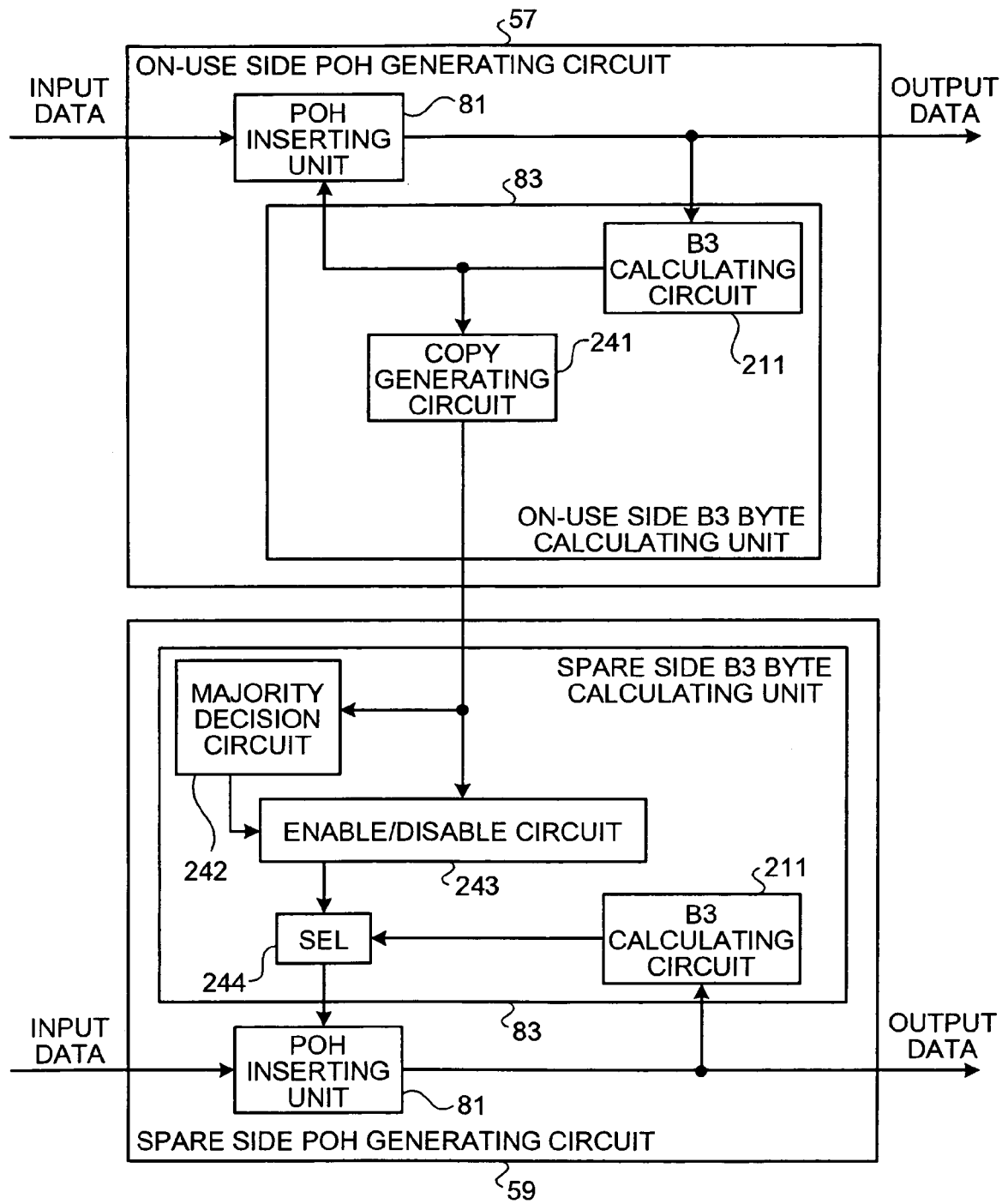
FIG. 28 is a schematic diagram for explaining an operation of the configuration shown in FIG. 27.

FIG. 28 is a schematic diagram for explaining an operation of the configuration shown in FIG. 27. At the on-use side POH generating circuit 57, as shown in FIG. 28, a B3 byte calculation result put out of the B3 calculating circuit 211 is sent to the POH inserting unit 81. At the on-use side POH generating circuit 57, the copy generating circuit 241 generates two or more copies of the B3 byte calculation result, and three or more B3 byte calculation results of the same value are sent simultaneously to the spare side POH generating circuit 59.

At the spare side POH generating circuit 59, when the B3 byte calculation results sent simultaneously from the on-use side POH generating circuit 57 have the same value, the enable/disable circuit 243 and the selector 244 operate to select the same value and send the value to the POH inserting unit 81. On the other hand, when a part of the B3 byte calculation results sent simultaneously from the on-use side POH generating circuit 57 is damaged, the majority decision circuit 242 makes a majority decision judgment on the B3 byte calculation results, and adopts a value decided on by majority as a normal value, which is then sent to the POH inserting unit 81. The above operation provides resistance against a data error.

(12) Fifth Example of Configuration for Producing Identical B3 Byte Data

Figure 29:
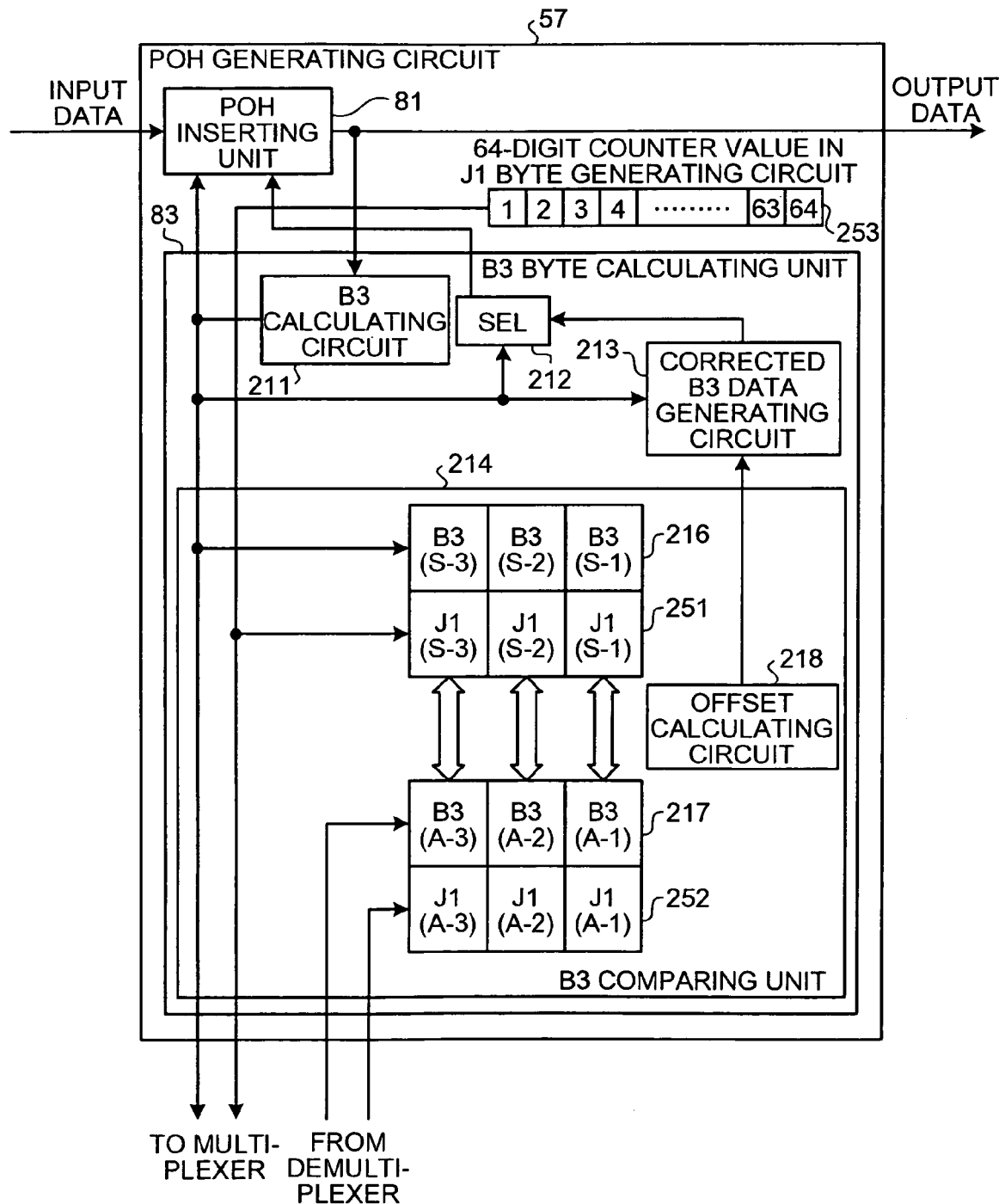
FIG. 29 is a schematic diagram for illustrating a fifth example of the configuration for producing identical B3 byte data.

FIG. 29 is a schematic diagram for illustrating a fifth example of the configuration for producing identical B3 byte data. As shown in FIG. 29, the fifth example is different from (8) First Example of Configuration for Producing Identical B3 Byte Data. The difference is that the B3 comparing unit 214 does not have the timing shift circuit 215, but has a spare side J1 counter value holding memory 251, and an on-use side J1 counter value holding memory 252.

The spare side J1 counter value holding memory 251 holds, for example, 64-digit counter values 253 in a J1 byte generating circuit. The counter values 253 are, for example, values of the address counter 102 that are used to read J1 byte data out of a buffer memory. The counter values 253, together with B3 byte calculation results put out of the B3 calculating circuit 211, are sent to the multiplexer 84 (not shown; see FIG. 2). The on-use side J1 counter value holding memory 252 holds counter values sent from the demultiplexer 85 (not shown; see FIG. 2). The following description is made on the assumption, but without limitation, that the on-use side and the spare side each holds B3 byte calculation results and counter values for three frames.

Figure 30:
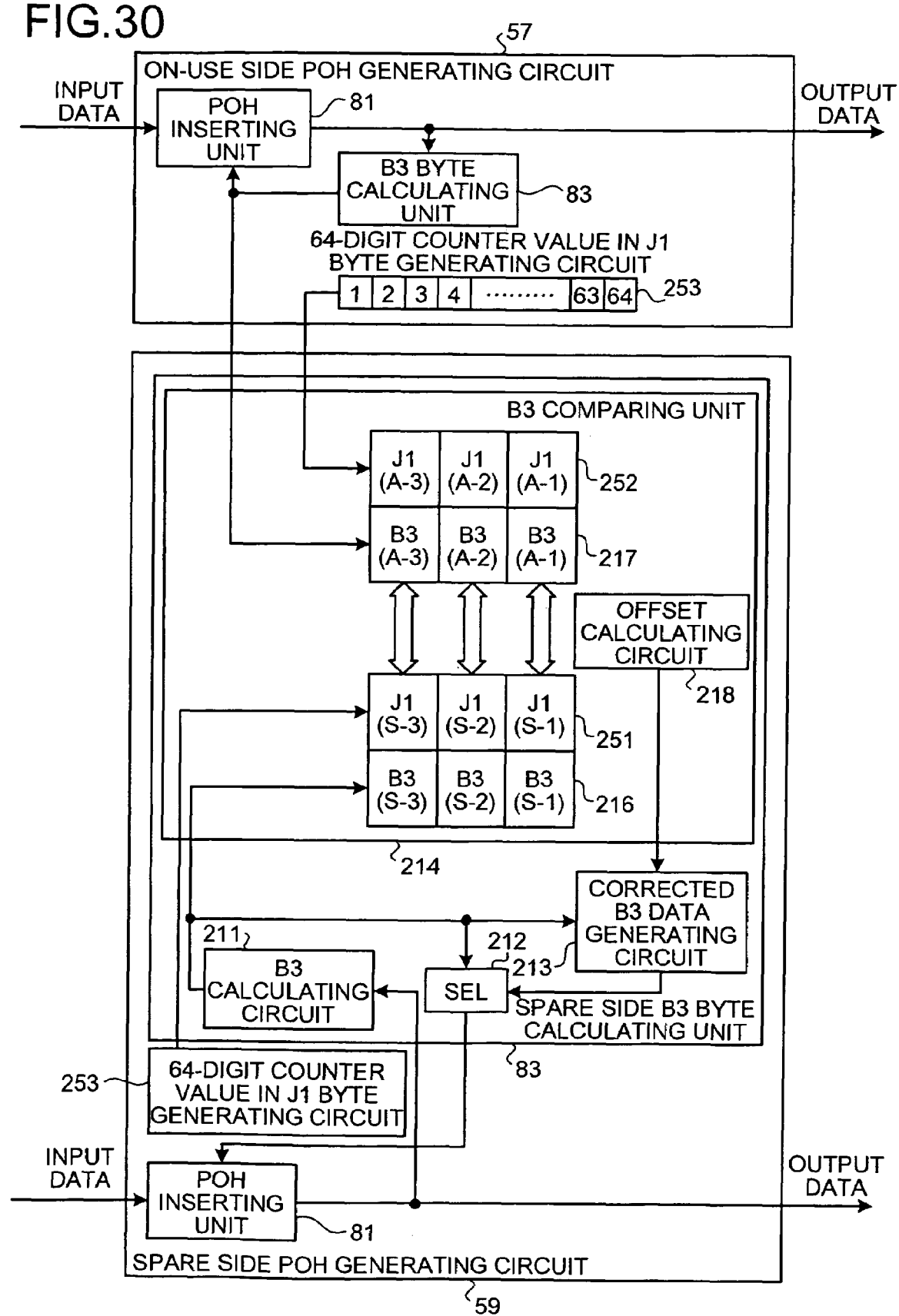
FIG. 30 is a schematic diagram for explaining an operation of the configuration shown in FIG. 29.

FIG. 30 is a schematic diagram for explaining an operation of the configuration shown in FIG. 29. As shown in FIG. 30, at the on-use side POH generating circuit 57, B3 byte calculation results put out of the B3 byte calculating unit 83 are sent to the POH inserting unit 81. At the on-use side POH generating circuit 57, the B3 byte calculation results and, for example, 64-digit counter values 253 in the J1 byte generating circuit for the same frames for the B3 byte calculation results are sent to the spare side POH generating circuit 59. At the spare side POH generating circuit 59, the on-use side B3 calculation result holding memory 217 holds the B3 byte calculation results from the on-use side POH generating circuit 57, and the on-use side J1 counter value holding memory 252 holds the counter values from the POH generating circuit 57.

At the spare side POH generating circuit 59, the spare side B3 calculation result holding memory 216 holds B3 byte calculation result put out of the B3 calculation circuit 211, and the spare side J1 counter value holding memory 251 holds, for example, 64-digit counter values 253 in the J1 byte generating circuit for the same frames for the B3 byte calculation results. The offset calculating circuit 218 at the spare side POH generating circuit 59 compares each set of B3 calculation results having identical counter values, one of which is held in the spare side J1 counter value holding memory 251 and the other of which in the on-use side J1 counter value holding memory 252. The comparison determines a correction value.

The way of calculating the correction value and an operation after the calculation is the same as described in (8) First Example of Configuration for Producing Identical B3 Byte Data. According to the fifth example, the time correspondence to on-use side data can be judged at the spare side. This reduces the circuit scale of the B3 comparing unit 214 or the amount of process to be executed by the B3 comparing unit 214. Identical B3 byte data, therefore, can be produced easily. In addition, since the on-use side and spare side have the 64-digit counters that operate at the same timing, the operation of the fifth example permits process time scattering of up to 8 millisecond (msec) (=125 μsec/frame×64 frames). The fifth example, therefore, further eases a limitation on a process time than (9) Second Example of Configuration for Producing Identical J1 Byte Data does.

As described above, according to the embodiments of the present invention, the identical J1 byte data and the identical B3 byte calculation result can be put out of the on-use side POH generating circuit 57 and of the spare side POH generating circuit 59. STS-POH output data at the on-use side and at the spare side, therefore, can be matched to each other. This enables error-free switchover with no operational interruption between the on-use side and the spare side in a redundant structure, which includes an application to an SDH system. The embodiments according to the present invention do not apply to a case where a system is automatically switched from the on-use side onto the spare side upon a system failure.

According to the embodiments described above, when a plug-in card operates as an on-use side plug-in card, another plug-in card operating as a spare side plug-in card in a redundant structure is supplied with information for causing the spare side plug-in card to put out the same J1 byte value and B3 byte value that are put out of the on-use side plug-in card. When a plug-in card operates as the spare side plug-in card, therefore, the card is capable of putting out the same J1 byte value and B3 byte value that are put out of another plug-in card operating as the on-use side plug-in card in the redundant structure.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A plug-in card for an optical transmission apparatus, the plug-in card comprising:
    a POH inserting unit that inserts a path overhead byte including J1 byte data and B3 byte data into input data;
    a J1 byte generating unit that generates J1 byte data for the path overhead byte to send the generated J1 byte data to the POH inserting unit, and that sends information on the J1 byte data to a second plug-in card operating at a spare side in a redundant structure when the plug-in card operates as an on-use side plug-in card, the J1 byte generating unit receiving information on J1 byte data from the second plug-in card operating at the on-use side in the redundant structure, the information being used by the plug-in card at the on-use side, to match spare side J1 byte data to on-use side J1 byte data on the basis of the information, and sending the matched J1 byte data to the POH inserting unit when the plug-in card operates as a spare side plug-in card; and
    a B3 byte calculating unit that generates B3 byte data for the path overhead to send the generated B3 byte data to the POH inserting unit, and that sends information on the B3 byte data to the second plug-in card operating at the spare side when the plug-in card operates as the on-use side plug-in card, the B3 byte calculating unit receiving information on B3 byte data from the second plug-in card operating at the on-use side, the information being used by the plug-in card at the on-use side, to match spare side B3 byte data to on-use side B3 byte data on the basis of the information, and sending the matched B3 byte data to the POH inserting unit when the plug-in card operates as the spare side plug-in card.

2. The plug-in card according to claim 1, wherein the J1 byte generating unit includes
    a first buffer memory that stores J1 byte data externally input;
    a second buffer memory that stores J1 byte data externally input;
    an address counter that issues an address for reading J1 byte data out of the first buffer memory and out of the second buffer memory when the plug-in card operates as the on-use side plug-in card; and
    a selector that selects J1 byte data read out of the first buffer memory to send the selected J1 byte data to the POH inserting unit when the plug-in card operates as the on-use side plug-in card, the selector selecting J1 byte data sent from the second plug-in card operating at the on-use side to send the selected J1 byte data to the POH inserting unit when the plug-in card operates as the spare side plug-in card, and the J1 byte generating unit sends J1 byte data read out of the second buffer memory to the second plug-in card operating at the spare side when the plug-in card operates as the on-use side plug-in card.

3. The plug-in card according to claim 2, further comprising an offset circuit that adds an offset value to a counter value put out of the address counter, the offset value being equivalent to a delay in a signal transfer from the on-use side to the spare side, to generate an address for reading J1 byte data out of the second buffer memory.

4. The plug-in card according to claim 1, wherein
the B3 byte calculating unit includes
a B3 calculating circuit that executes B3 calculation based on a calculation result from a B3 calculation range in a previous frame;
a B3 comparing unit that compares B3 byte data output from the B3 calculating circuit with B3 byte data sent from the second plug-in card operating at the on-use side when the plug-in card operates as the spare side plug-in card; and
a B3-data correcting circuit that corrects spare side B3 byte data based on a result of comparison by the B3 comparing unit, and
the B3 byte calculating unit sends B3 byte data output from the B3 calculating circuit to the second plug-in card operating at the spare side and also to the POH inserting unit when the plug-in card operates as the on-use side plug-in card, while the B3 byte calculating unit sends corrected B3 byte data output from the corrected B3 data generating circuit to the POH inserting unit when the plug-in card operates as the spare side plug-in card.

5. The plug-in card according to claim 4, the plug-in card further comprising a timing shift circuit that shifts a timing of B3 byte data output from the B3 calculating circuit by a time equivalent to a delay in a signal transfer from the on-use side to the spare side.

6. The plug-in card according to claim 1, wherein
the J1 byte generating unit includes
a buffer memory that stores J1 byte data externally input;
a pattern detecting unit that detects a specific pattern in a J1 path trace to generate a timing signal when the plug-in card operates as the on-use side plug-in card; and
an address counter that issues an address for reading J1 byte data out of the buffer memory, and that resets a counter value based on a timing signal sent from the second plug-in card operating at the on-use side when the plug-in card operates as the spare side plug-in card, and
the J1 byte generating unit sends J1 byte data read out of the buffer memory to the POH inserting unit based on the counter value of the address counter.

7. The plug-in card according to claim 6, wherein the pattern detecting unit detects a CR code located at an end of the J1 path trace.

8. The plug-in card according to claim 6, further comprising an offset circuit that delays a timing of the timing signal by a time equivalent to a delay in a signal transfer from the on-use side to the spare side.

9. The plug-in card according to claim 1, wherein
the J1 byte generating unit includes
a buffer memory that stores J1 byte data externally input;
an address counter that issues an address for reading J1 byte data out of the buffer memory; and
a selector that selects a counter value of the address counter when the plug-in card operates as the on-use side plug-in card, the selector selecting a counter value sent from the second plug-in card operating at the on-use side when the plug-in card operates as the spare side plug-in card, each counter value being selected as the address for reading J1 byte data out of the buffer memory, and
the J1 byte generating unit sends the counter value of the address counter to the second plug-in card operating at the spare side, and sends J1 byte data read out of the buffer memory to the POH inserting unit based on a counter value selected by the selector when the plug-in card operates as the on-use side plug-in card.

10. The plug-in card according to claim 9, further comprising an offset circuit that adds an offset value to an address value for reading on-use side J1 byte data out of the buffer memory, the offset value being equivalent to a delay in a signal transfer from the on-use side to the spare side, to generate an address for reading spare side J1 byte data out of the buffer memory.

11. The plug-in card according to claim 1, wherein
the J1 byte generating unit includes
a buffer memory that stores J1 byte data of external input;
an address counter that issues an address for reading J1 byte data out of the buffer memory, and that shifts a counter value based on a counter shift signal when the plug-in card operates as the spare side plug-in card;
an on-use/spare comparing circuit that compares the counter value of the address counter with a counter value sent from the second plug-in card operating at the on-use side and compares spare side H4 byte data with H4 byte data sent from the second plug-in card operating at the on-use side when the plug-in card operates as the spare side plug-in card; and
a coincidence/no-coincidence circuit that outputs the counter shift signal to the address counter when a result of comparison by the on-use/spare comparing circuit is no-coincidence, and
the J1 byte generating unit sends the counter value of the address counter and on-use side H4 byte data to the second plug-in card operating at the spare side, and sends J1 byte data read out of the buffer memory to the POH inserting unit based on the counter value of the address counter when the plug-in card operates as the on-use side plug-in card.

12. The plug-in card according to claim 11, further comprising an offset circuit that adds, when the plug-in card operates as the spare side plug-in card, an offset value to the counter value of the address counter and to the spare side H4 byte data, the offset value being equivalent to a delay in a signal transfer from the on-use side to the spare side.

13. The plug-in card according to claim 1, wherein
the J1 byte generating unit includes
a buffer memory that stores J1 byte data of external input;
a pattern detecting unit that detects a specific pattern in a J1 path trace to generate a timing signal;
an address counter that issues an address for reading J1 byte data out of the buffer memory, and that shifts a counter value based on a counter shift signal when the plug-in card operates as the spare side plug-in card;
an on-use/spare comparing circuit that compares a spare side timing signal with a timing signal sent from the second plug-in card operating at the on-use side and compares spare side H4 byte data with H4 byte data sent from the second plug-in card operating at the on-use side when the plug-in card operates as the spare side plug-in card; and a coincidence/no-coincidence circuit that outputs the counter shift signal to the address counter when a result of comparison by the on-use/spare comparing circuit is no-coincidence, and the J1 byte generating unit sends an on-use side timing signal and on-use side H4 byte data to the second plug-in card operating at the spare side, and sends J1 byte data read out of the buffer memory to the POH inserting unit based on a counter value of the address counter when the plug-in card operates as the on-use side plug-in card.

14. The plug-in card according to claim 13, further comprising an offset circuit that adds, when the plug-in card operates as the spare side plug-in card, an offset value to the counter value of the address counter, the offset value being equivalent to a delay in a signal transfer from the on-use side to the spare side.

15. The plug-in card according to claim 4, wherein
the B3 byte calculating unit sends the B3 byte data, together with H4 byte data, from the on-use side to the spare side, and
the B3 comparing unit compares each pair of B3 byte data having spare side H4 byte data and on-use side H4 byte data that are identical with each other.

16. The plug-in card according to claim 1, further comprising a selector that selects B3 byte data output from the B3 byte calculating unit to send the selected B3 byte data to the POH inserting unit when the plug-in card operates as the on-use side plug-in card, the selector selecting B3 byte data sent from the second plug-in card operating at the on-use side to send the selected B3 byte data to the POH inserting unit when the plug-in card operates as the spare side plug-in card, wherein
the J1 byte generating unit sends the b3 byte data output from the B3 byte calculating unit to the second plug-in card operating at the spare side within one frame when the plug-in card operates as the on-use side plug-in card.

17. The plug-in card according to claim 16, wherein
the B3 byte calculating unit includes
a B3 calculating circuit that executes B3 calculation based on a calculation result from a B3 calculation range in a previous frame;
a copy generating circuit that generates a plurality of copies of B3 byte data output from the B3 calculating circuit to send the copies to the second plug-in card operating at the spare side when the plug-in card operates as the on-use side plug-in card;
a majority decision circuit that performs a majority decision judgment on a plurality of copies of B3 byte data sent from the second plug-in card operating at the on-use side, and that adopts a data copy decided on by majority as normal B3 byte data when the plug-in card operates as the spare side plug-in card; and
a selector that selects B3 byte data put out of the B3 calculating circuit to send the selected B3 byte data to the POH inserting unit when the plug-in card operates as the on-use side plug-in card, the selector selecting B3 byte data output from the majority decision circuit to send the selected B3 byte data to the POH inserting unit when the plug-in card operates as the spare side plug-in card.

18. The plug-in card according to claim 4, wherein
the B3 byte calculating unit sends the B3 byte data, together with values of the address counter issuing an address for generating J1 byte data, from the on-use side to the spare side, and
the B3 comparing unit compares each pair of B3 byte data having a spare side counter value and an on-use side counter value that are identical with each other.

* * * * *

UNITED STATES PATENT AND TRADEMARK OFFICE
CERTIFICATE OF CORRECTION

PATENT NO. : 7,639,702 B2  Page 1 of 1
APPLICATION NO. : 11/528370
DATED : December 29, 2009
INVENTOR(S) : Hideki Matsui et al.

It is certified that error appears in the above-identified patent and that said Letters Patent is hereby corrected as shown below:

Title Page, item [57] Column 2 (Abstract), Line 2, change "J1generating" to --J1 byte generating--.

Title Page, item [57] Column 2 (Abstract), Line 2, change "J1 generating" to --J1 byte generating--.

Title Page, item [57] Column 2 (Abstract), Line 3, change "J1 data" to --J1 byte data--.

Title Page, item [57] Column 2 (Abstract), Line 5, change "J1 generating" to --J1 byte generating--.

Title Page, item [57] Column 2 (Abstract), Line 6, change "J1 data" to --J1 byte data--.

Title Page, item [57] Column 2 (Abstract), Line 8, change "J1 generating" to --J1 byte generating--.

Title Page, item [57] Column 2 (Abstract), Line 9, change "J1 data" to --J1 byte data--.

Title Page, item [57] Column 2 (Abstract), Line 9, change "J1 data." to --J1 byte data.--.

Title Page, item [57] Column 2 (Abstract), Line 11, change "J1 generating" to --J1 byte generating--.

Signed and Sealed this

Sixteenth Day of March, 2010

David J. Kappos
*Director of the United States Patent and Trademark Office*